United States Patent
Yamaoka et al.

(10) Patent No.: US 10,770,917 B2
(45) Date of Patent: Sep. 8, 2020

(54) POWER TRANSMISSION SYSTEM TRANSMITTING POWERS FROM MULTIPLE POWER TRANSMITTER APPARATUSES TO MULTIPLE POWER RECEIVER APPARATUSES, AND CAPABLE OF DISTINGUISHING AND SEPARATING TRANSMITTED POWERS

(71) Applicant: PANASONIC INTELLECTUAL PROPERTY MANAGEMENT CO., LTD., Osaka (JP)

(72) Inventors: Masahiro Yamaoka, Osaka (JP); Akira Minegishi, Osaka (JP); Junichi Kanou, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/347,772

(22) PCT Filed: Nov. 7, 2017

(86) PCT No.: PCT/JP2017/040027
§ 371 (c)(1),
(2) Date: May 6, 2019

(87) PCT Pub. No.: WO2018/088379
PCT Pub. Date: May 17, 2018

(65) Prior Publication Data
US 2019/0319484 A1   Oct. 17, 2019

(30) Foreign Application Priority Data
Nov. 8, 2016  (JP) ................. 2016-218156

(51) Int. Cl.
*H02J 13/00* (2006.01)
*H02J 3/14* (2006.01)
(Continued)

(52) U.S. Cl.
CPC .......... *H02J 13/00007* (2020.01); *H02J 3/14* (2013.01); *H02J 4/00* (2013.01); *H02J 13/0003* (2013.01);
(Continued)

(58) Field of Classification Search
CPC .......... H04J 4/00; H02J 1/08; H02J 13/00007; H02J 3/14; H02J 4/00; H02J 13/0003;
(Continued)

(56) References Cited

U.S. PATENT DOCUMENTS

| 8,519,832 B2 * | 8/2013 | Loporto | G01D 4/004 340/12.32 |
| 8,605,798 B2 * | 12/2013 | Lee | H03K 7/08 326/30 |

(Continued)

FOREIGN PATENT DOCUMENTS

| JP | S59-165925 A | 9/1984 |
| JP | 2011-091954 A | 5/2011 |

(Continued)

OTHER PUBLICATIONS

Notification of Transmittal of Translation of the International Preliminary Report on Patentability issued in corresponding International Patent Application No. PCT/JP2017/040027, dated May 23, 2019.

(Continued)

*Primary Examiner* — Nam V Nguyen
(74) *Attorney, Agent, or Firm* — McDermott Will & Emery LLP

(57) ABSTRACT

Each one of code modulators modulates first power to generate a code-modulated wave using a modulation code (Continued)

based on a code sequence, and transmits the code-modulated wave to one of code demodulators. Each one of code demodulator receives the code-modulated wave from one of the code modulators, and demodulates the received code-modulated wave to generate second power using a demodulation code based on a code sequence identical to the code sequence of the modulation code used. When power is transmitted between each one of transmitter and receiver pairs, a controller selects and assigns code sequences to the transmitter and receiver pairs, so as to reduce an average of an absolute value of a total current of the code-modulated waves of the transmitter and receiver pairs in a transmission path, as compared to a reference value, the average being averaged over a predetermined time.

17 Claims, 27 Drawing Sheets

(51) Int. Cl.

| | | |
|---|---|---|
| *H02J 4/00* | (2006.01) | |
| *H02M 7/5387* | (2007.01) | |
| *H04B 3/54* | (2006.01) | |
| *H04L 25/49* | (2006.01) | |
| *H04Q 11/04* | (2006.01) | |
| *H02M 1/00* | (2006.01) | |

(52) U.S. Cl.
CPC .......... *H02M 7/5387* (2013.01); *H04B 3/542* (2013.01); *H04L 25/4904* (2013.01); *H04Q 11/04* (2013.01); *H02M 2001/008* (2013.01)

(58) Field of Classification Search
CPC .... H02J 13/00004; H02J 2310/12; H02J 3/46; H02J 13/00009; H02M 5/297; H02M 7/5387; H02M 2001/008; H02M 2001/007; H02M 7/219; H04B 3/542; H04L 25/4904; H04Q 11/04
USPC ............................... 340/12.32, 12.33, 13.23
See application file for complete search history.

(56) References Cited

U.S. PATENT DOCUMENTS

| | | | |
|---|---|---|---|
| 9,966,939 B2 * | 5/2018 | Yamaoka | ............ H02M 7/4807 |
| 10,122,289 B2 * | 11/2018 | Yamaoka | ............... H02M 5/297 |
| 10,168,728 B2 * | 1/2019 | Kogo | ........................ H02J 3/14 |
| 10,187,115 B2 * | 1/2019 | Kahn | ..................... H04B 3/548 |
| 2012/0173035 A1 | 7/2012 | Abe | |
| 2014/0055250 A1 * | 2/2014 | Speegle | ............... H05B 47/185 340/12.32 |
| 2015/0355667 A1 | 12/2015 | Kogo | |

FOREIGN PATENT DOCUMENTS

| | | |
|---|---|---|
| JP | 5612718 B2 | 10/2014 |
| JP | 5612920 B2 | 10/2014 |
| JP | 2016-136821 A | 7/2016 |
| WO | 2011/048777 A1 | 4/2011 |
| WO | 2014/115218 A1 | 7/2014 |

OTHER PUBLICATIONS

International Search Report and Written Opinion issued in International Patent Application No. PCT/JP2017/040027, dated Dec. 12, 2017; with partial English translation.

* cited by examiner

POWER TRANSMISSION SYSTEM TRANSMITTING POWERS FROM MULTIPLE POWER TRANSMITTER APPARATUSES TO MULTIPLE POWER RECEIVER APPARATUSES, AND CAPABLE OF DISTINGUISHING AND SEPARATING TRANSMITTED POWERS

CROSS-REFERENCE OF RELATED APPLICATIONS

This application is the U.S. National Phase under 35 U.S.C. § 371 of International Patent Application No. PCT/JP2017/040027, filed on Nov. 7, 2017, which in turn claims the benefit of Japanese Application No. 2016-218156, filed on Nov. 8, 2016, the entire disclosures of which Applications are incorporated by reference herein.

TECHNICAL FIELD

The present disclosure relates to a power transmission system which transmits powers (electric powers) from a plurality of power transmitter apparatuses to a plurality of power receiver apparatuses via a common transmission path.

BACKGROUND ART

In recent years, power supplies of renewable energy, typically photovoltaic power generation, wind power generation, and biofuel power generation, are increasingly used, as well as conventional power supplies provided by power companies, such as thermal power generation, hydropower generation, and nuclear power generation. In addition, apart from large-scale commercial power networks currently provided, local and small-scale power networks capable of achieving local production and local consumption of power have been being spread worldwide in order to reduce losses of long-distance power transmission.

In a small-scale power network, power can be supplied self-sufficiently by using a natural energy power generator, and electric load equipment capable of efficient power regeneration. This type of power network is highly promising as a power transmission system for supplying electricity to non-electrified areas, such as desert oasis and remote islands.

For example, each of Patent Documents 1 to 3 discloses a power transmission system which transmits power from a power supply to a load via a power line.

CITATION LIST

Patent Documents

PATENT DOCUMENT 1: Japanese Patent Publication No. 5612718 B
PATENT DOCUMENT 2: Japanese Patent Publication No. 5612920 B
PATENT DOCUMENT 3: Japanese Patent laid-open Publication No. 2011-091954 A

SUMMARY OF INVENTION

Technical Problem

A certain type of power transmission system may transmit powers from a plurality of power supplies to a plurality of loads via a common transmission path. In this case, in order to transmit power from a specific power supply to a specific load, it is required to distinguish different power portions transmitted from different power supplies in entire power transmitted via the transmission path, as different power components, and separately receive desired power components at the loads, respectively.

In addition, when transmitting powers from a plurality of power supplies to a plurality of loads via a common transmission path, simultaneously, a total amount of current flowing in the transmission path may considerably increase. In order to implement a transmission path capable of flowing a sufficiently large allowable current, it is necessary to increase cross-sectional areas of electric wires and cables, etc., thus increasing a cost of the transmission path. Accordingly, in order to reduce the cost of the transmission path, it is required to reduce the total amount of current flowing in the transmission path.

An object of the present disclosure is to solve the aforementioned problems, and to provide a power transmission system which transmits powers from a plurality of power supplies to a plurality of loads, and is capable of distinguishing and separating transmitted powers from each other, and reducing a total amount of current flowing in a transmission path.

Solution to Problem

According an aspect of the present disclosure, a power transmission system is provided, the power transmission system including a plurality of power transmitter apparatuses, a plurality of power receiver apparatuses, and a controller, the power transmission system transmitting powers from the plurality of power transmitter apparatuses to the plurality of power receiver apparatuses via a transmission path. Each of the plurality of power transmitter apparatuses is provided with a code modulator that modulates first power to generate a code-modulated wave by code modulation using a modulation code based on a code sequence, and transmits the code-modulated wave to one of the plurality of power receiver apparatuses via the transmission path. Each of the plurality of power receiver apparatuses is provided with a code demodulator that receives the code-modulated wave from one of the plurality of power transmitter apparatuses via the transmission path, and demodulates the received code-modulated wave to generate second power by code demodulation using a demodulation code based on a code sequence identical to the code sequence of the modulation code used for the code modulation. When power is transmitted between each of a plurality of transmitter and receiver pairs, each of the transmitter and receiver pairs including one of the plurality of power transmitter apparatuses and one of the plurality of power receiver apparatuses, the controller selects and assigns a plurality of code sequences to the plurality of transmitter and receiver pairs, respectively, so as to reduce an average of an absolute value of a total current of the code-modulated waves of the plurality of transmitter and receiver pairs in the transmission path, as compared to a predetermined reference value, the average being averaged over a predetermined time.

These generic and specific aspects may be implemented as a system, as a method, or as any combination of systems and methods.

Advantageous Effects of Invention

The power transmission system according to the present disclosure is capable of distinguishing and separating transmitted powers from each other, and reducing a total amount of current flowing in a transmission path.

shows a signal waveform of a demodulated current I31; and (e) shows a signal waveform of a demodulated current I32.

Figure 20:
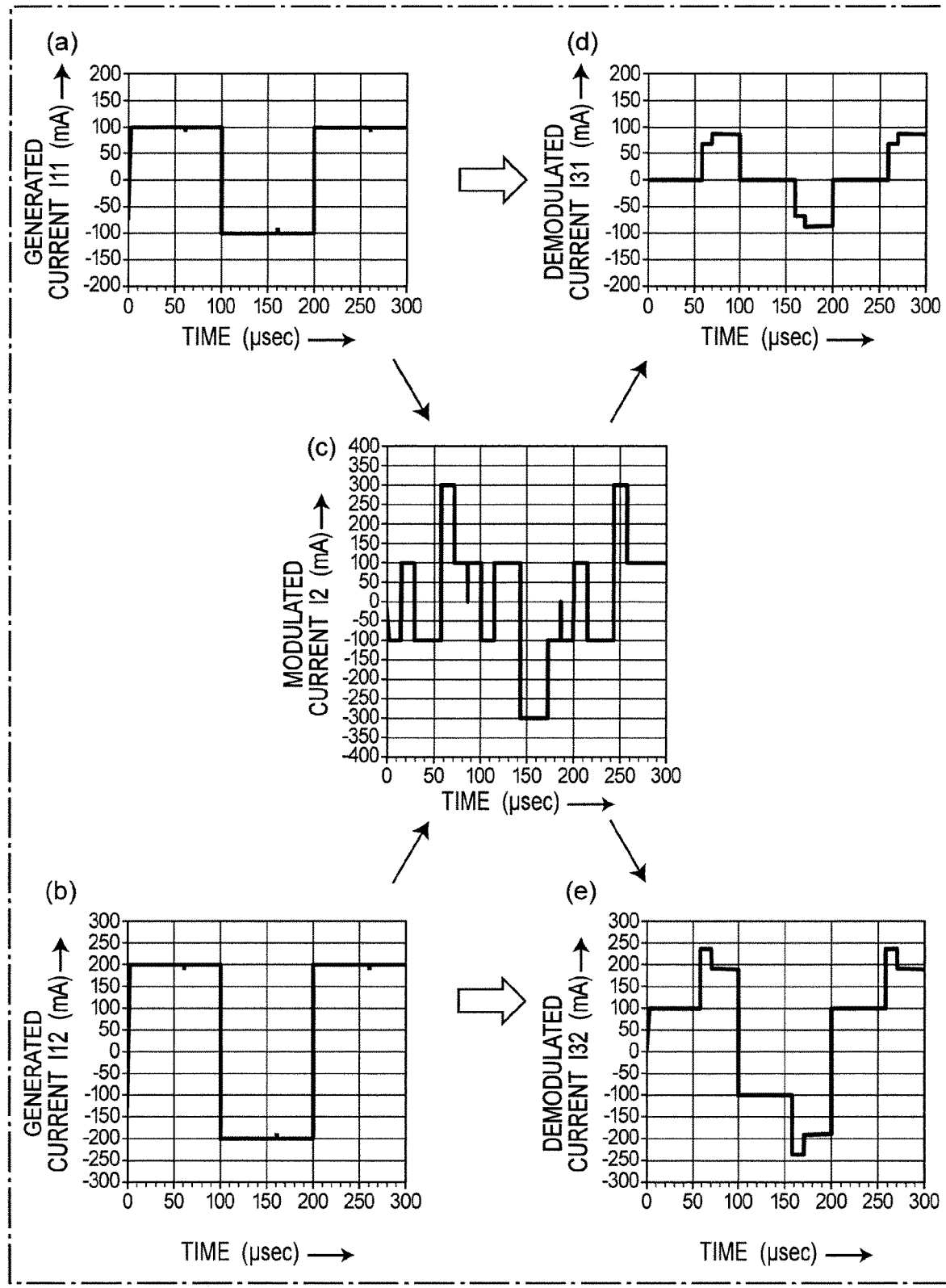

FIG. 20 is a waveform diagram showing exemplary signal waveforms in a power transmission system according to a second comparison example of the fourth embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Figure 21:
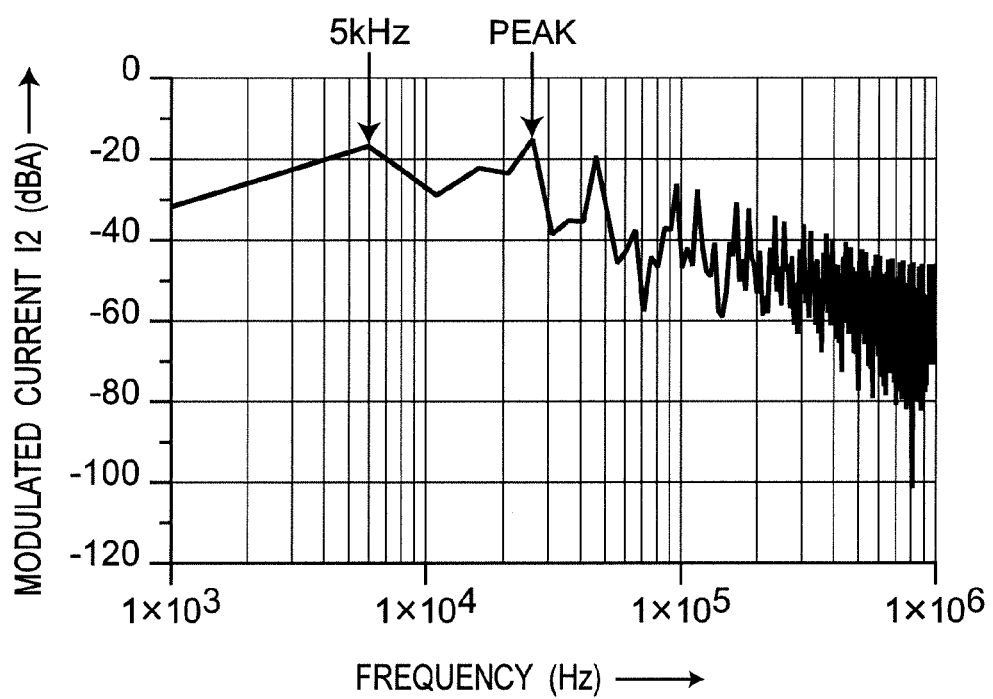

FIG. 21 is a diagram showing a frequency spectrum of the exemplary modulated current I2 in a power transmission system according to a first implementation example of a fifth embodiment.

Figure 22:
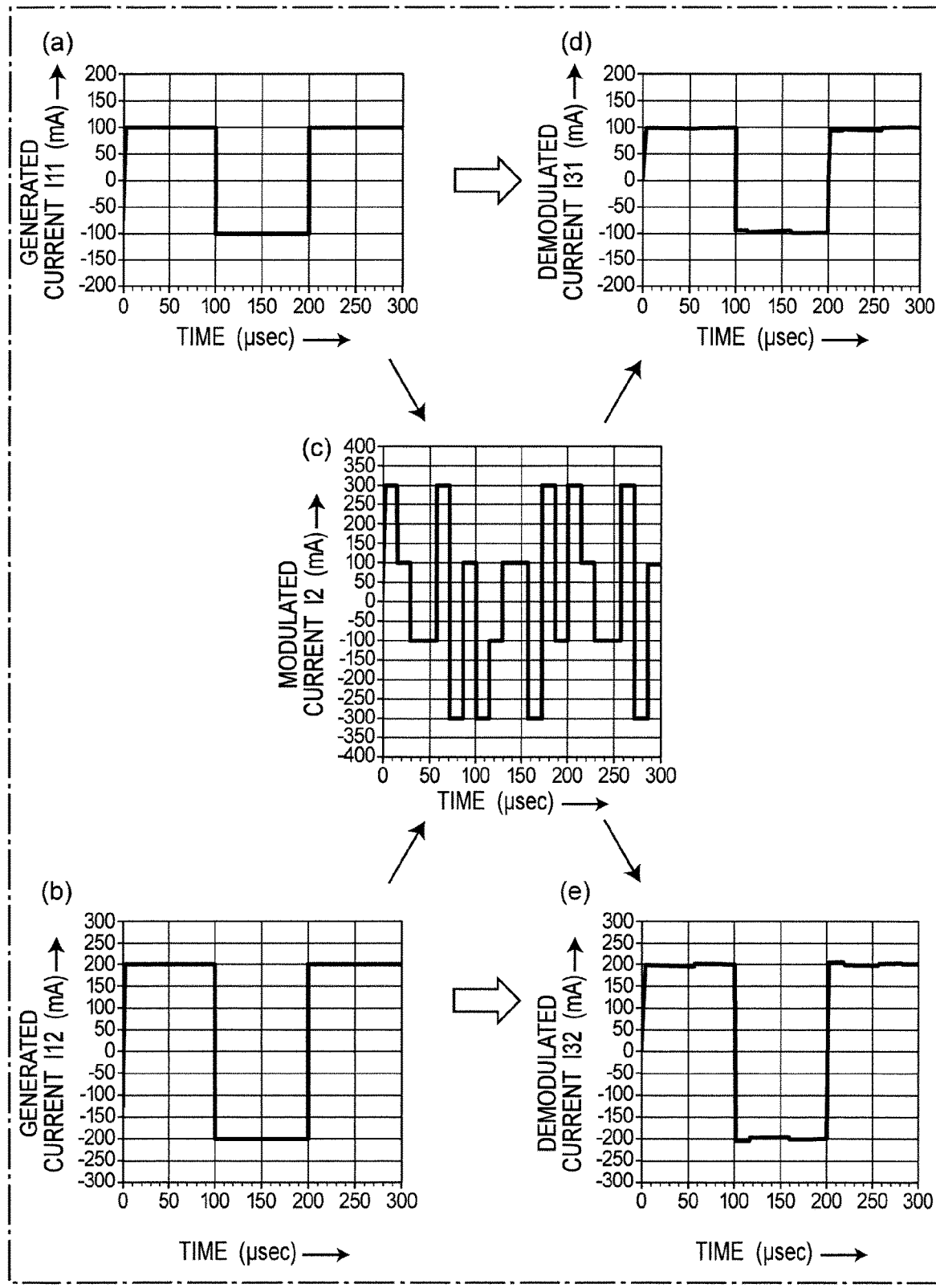

FIG. 22 is a waveform diagram showing exemplary signal waveforms in a power transmission system according to a second implementation example of the fifth embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Figure 23:
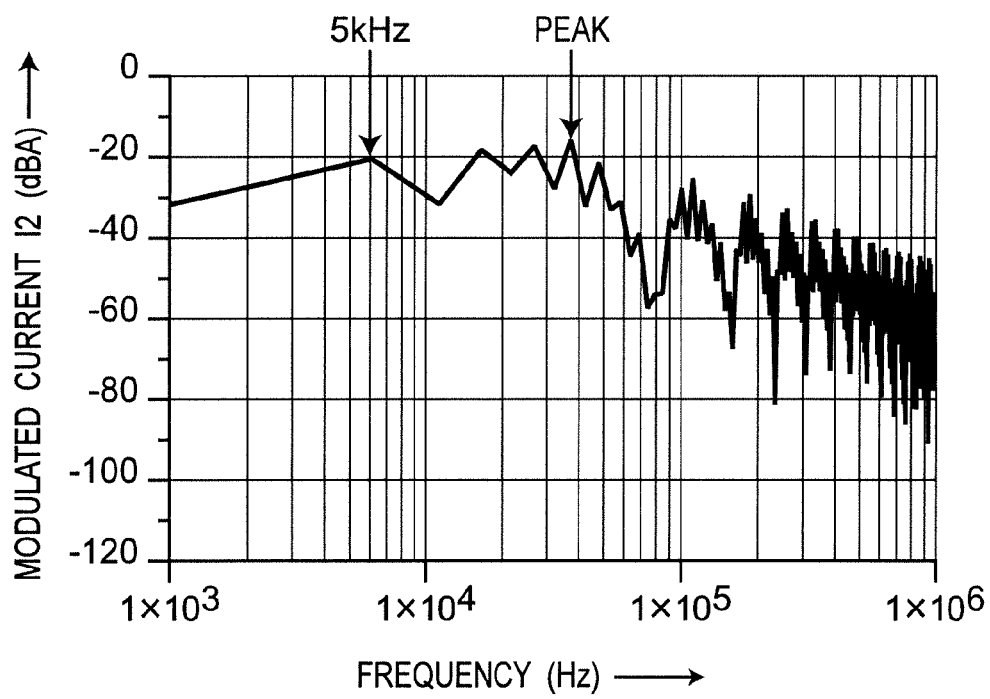

FIG. 23 is a diagram showing a frequency spectrum of the exemplary modulated current I2 in the power transmission system according to the second implementation example of the fifth embodiment.

Figure 24:
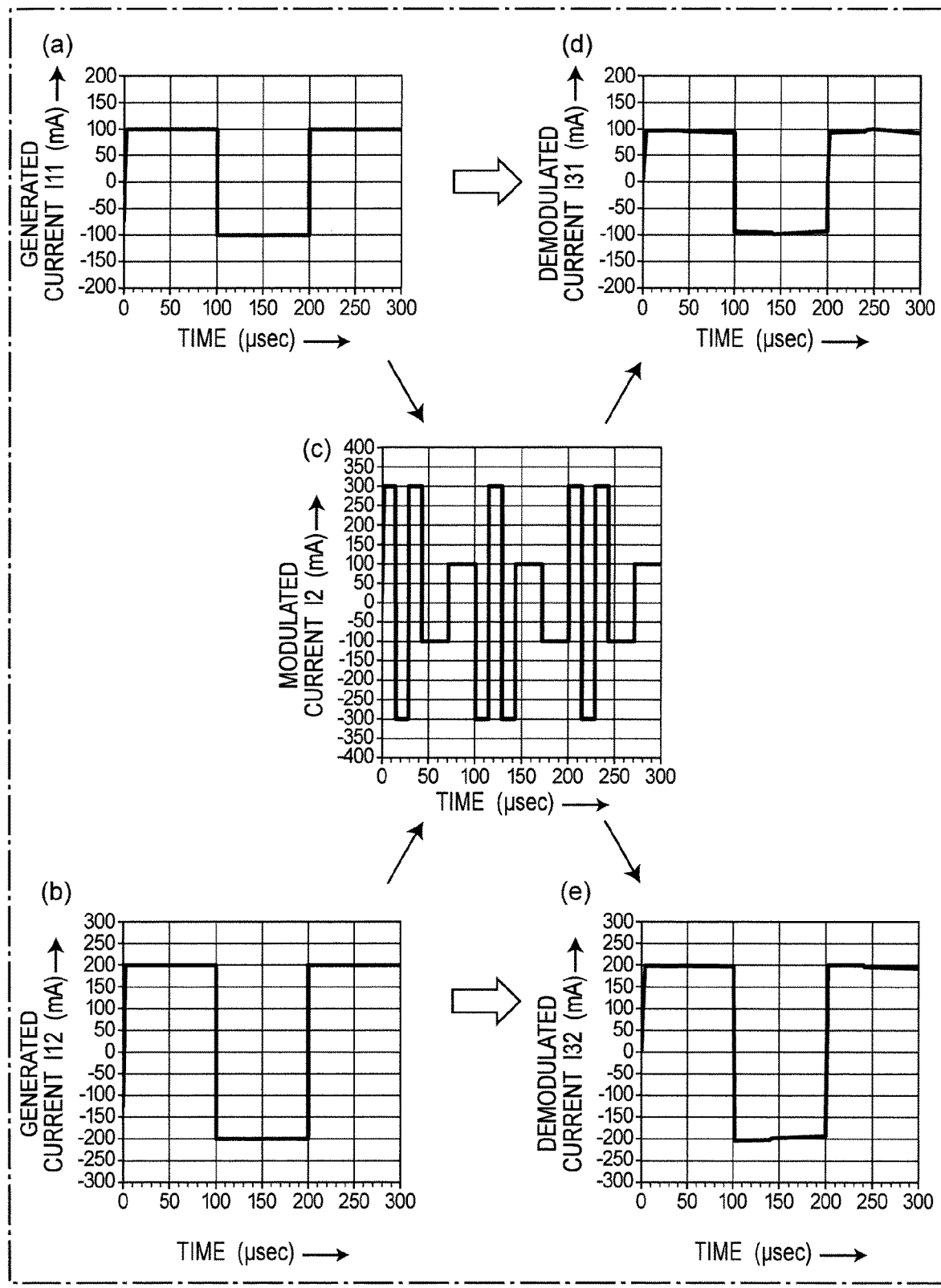

FIG. 24 is a waveform diagram showing exemplary signal waveforms in a power transmission system according to a third implementation example of the fifth embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Figure 25:
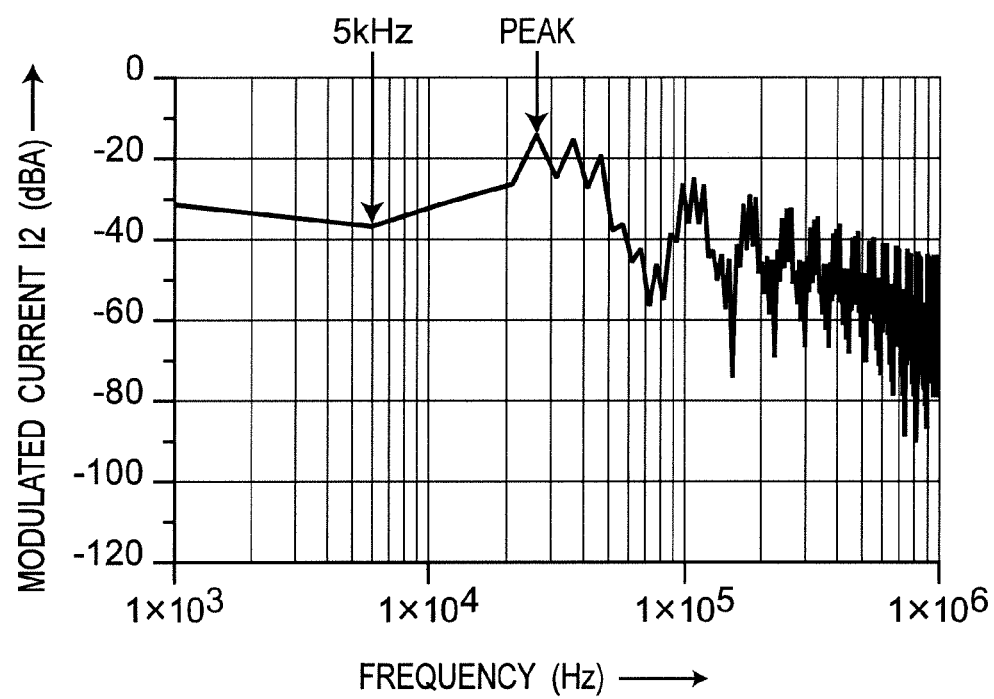

FIG. 25 is a diagram showing a frequency spectrum of the exemplary modulated current I2 in the power transmission system according to the third implementation example of the fifth embodiment.

Figure 26:
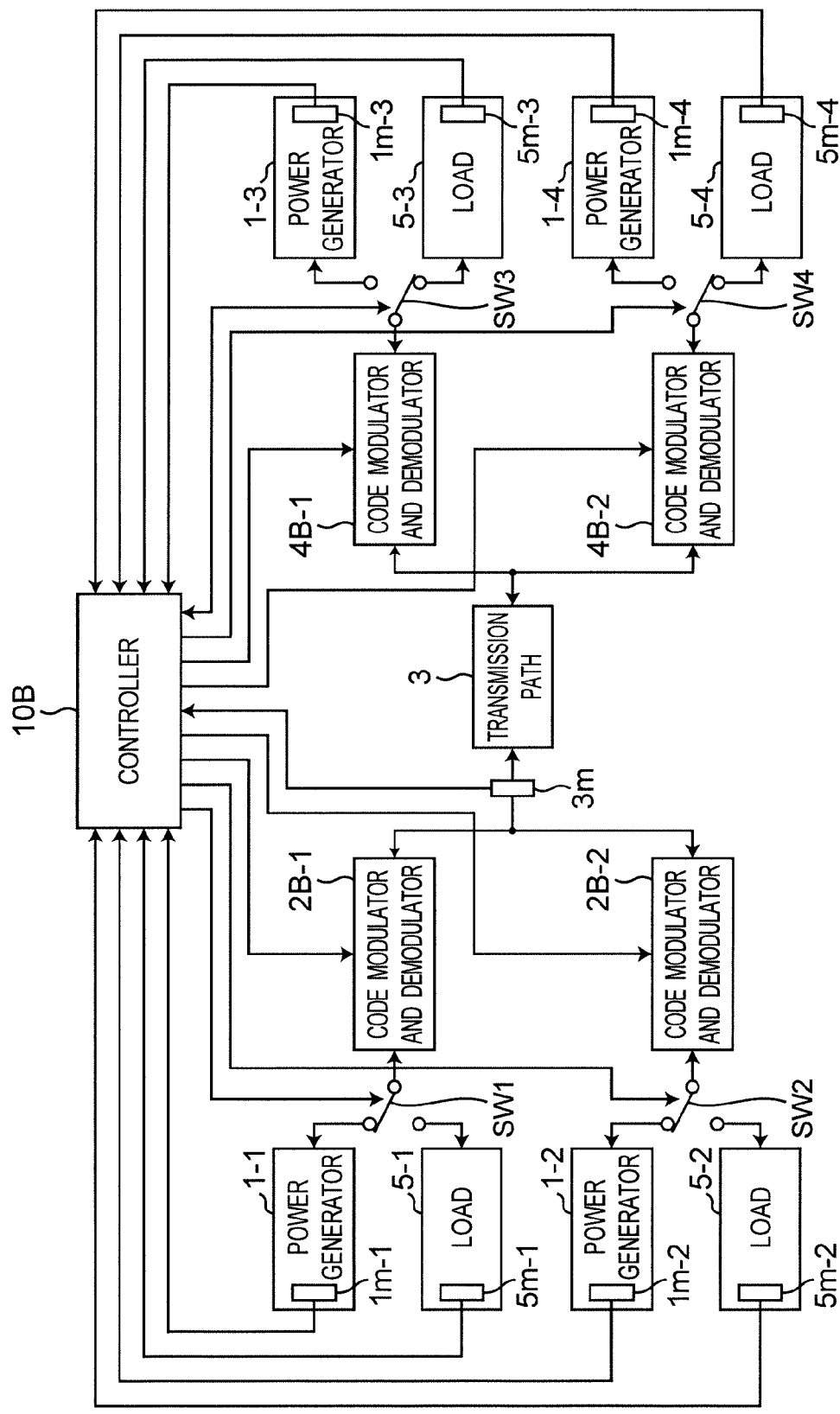

FIG. 26 is a block diagram showing a configuration of a power transmission system according to a sixth embodiment.

Figure 27:
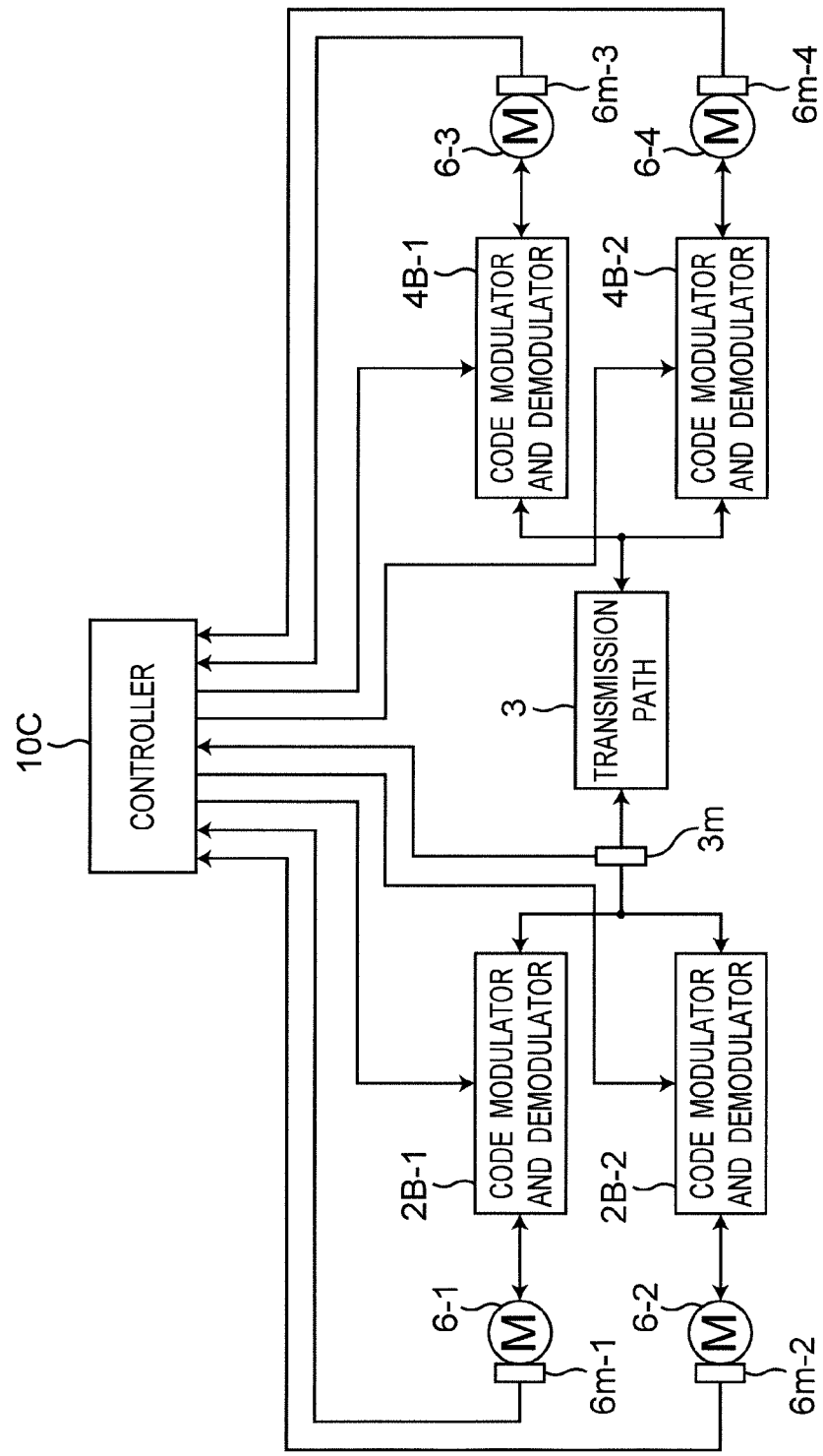

FIG. 27 is a block diagram showing a configuration of a power transmission system according to a modified embodiment of the sixth embodiment.

DESCRIPTION OF EMBODIMENTS

Hereinafter, embodiments according to the present disclosure will be described with reference to the drawings. In the following embodiments, similar constituent elements are denoted by identical reference numerals.

As described above, the object of the present disclosure is to provide a power transmission system which transmits powers from a plurality of power supplies to a plurality of loads, and is capable of distinguishing and separating transmitted powers from each other, and reducing a total amount of current flowing in a transmission path. In first to third embodiments, we describe preparatory overviews of power transmission systems. Thereafter, in fourth to sixth embodiments, we describe power transmission systems which solves the problems.

First Embodiment

Figure 1:
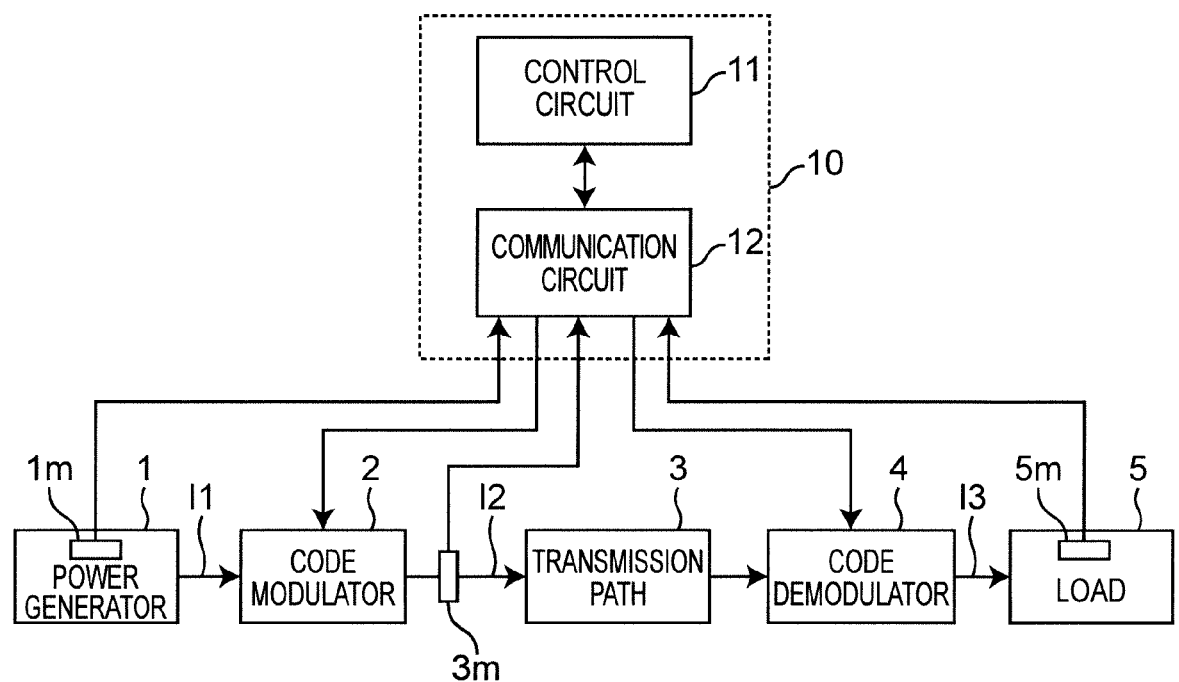
FIG. 1 is a block diagram showing a configuration of a power transmission system according to a first embodiment.

FIG. 1 is a block diagram showing a configuration of a power transmission system according to the first embodiment. Referring to FIG. 1, the power transmission system according to the first embodiment is provide with a power generator 1, a code modulator 2, a transmission path 3, a code demodulator 4, a load 5, and a controller 10. The transmission path 3 is, for example, a wired transmission path.

The controller 10 is provided with a control circuit 11 and a communication circuit 12. The control circuit 11 communicates with the code modulator 2 and the code demodulator 4 via the communication circuit 12, and controls operations of the code modulator 2 and the code demodulator 4.

In the power transmission system of FIG. 1, the code modulator 2 operates as a power transmitter apparatus, and the code demodulator 4 operates as a power receiver apparatus. The code modulator 2 modulates first power to generate a code-modulated wave by code modulation using a modulation code based on a code sequence, and transmits the code-modulated wave to the code demodulator 4 via the transmission path 3. The code demodulator 4 receives the code-modulated wave from the code modulator 2 via the transmission path 3, and demodulates the received code-modulated wave to generate second power by code demodulation using a demodulation code based on a code sequence identical to the code sequence of the modulation code used for the code modulation. The first power is, for example, direct-current power generated by the power generator 1, and is shown as a generated current I1 in FIG. 1. The code-modulated wave is alternating-current power modulated by code modulation, and is shown as a modulated current I2 in FIG. 1. The second power is, for example, direct-current power to be supplied to the load 5, and is shown as a demodulated current I3 in FIG. 1.

The power transmission system of FIG. 1 is further provided with power meters 1m and 5m. The power meter 1m is first power measuring means which measures an amount of the first power. More specifically, the power meter 1m measures an amount of direct-current power generated by the power generator 1 and transmitted from the power generator 1 to the code modulator 2. The power meter 1m may be provided to the power generator 1, or disposed between the power generator 1 and the code modulator 2. The power meter 5m is second power measuring means for measuring an amount of the second power. More specifically, the power meter 5m measures an amount of direct-current power transmitted from the code demodulator 4 to the load 5, and used by the load 5. The power meter 5m may be provided to the load 5, or may be disposed between the code demodulator 4 and the load 5. The amounts of powers measured by the power meters 1m and 5m are transmitted to the controller 10.

The power transmission system of FIG. 1 may be further provided with a current meter 3m. The current meter 3m is current measuring means for measuring an amount of current of a code-modulated wave (e.g., modulated current I2) transmitted in the transmission path 3. The amount of current of the code-modulated wave measured by the current meter 3m is transmitted to the controller 10.

The controller 10 controls operations of the code modulator 2 and the code demodulator 4 based on the amounts of powers received from the power meters 1m and 5m. For example, the controller 10 transmits control signals to the code modulator 2 and the code demodulator 4, the control signals including synchronization signals for synchronizing the code modulator 2 and the code demodulator 4 to each other, thus achieving code modulation and code demodulation of power in an accurately synchronized manner.

The controller 10 sets a modulation code to the code modulator 2, and a demodulation code to the code demodulator 4, based on one code sequence. The code sequence of the modulation code used for modulation by the code modulator 2, and the code sequence of the demodulation code used for demodulation by the code demodulator 4 may be set in advance to the code modulator 2 and the code demodulator 4. In addition, for example, the controller 10 may transmit, as the control signals, the code sequence of the modulation code used for modulation by the code modulator 2, and the code sequence of the demodulation code used for demodulation by the code demodulator 4. Further, the controller 10 may transmit, as the control signals, only information specifying the code sequences, without transmitting the code sequences themselves, so that the code modulator 2 and the code demodulator 4 to generates the code sequences, respectively. In this case, it is possible to achieve code modulation and code demodulation between the code modulator 2 and the code demodulator 4 corresponding to each other in an accurately synchronized manner.

Figure 2:
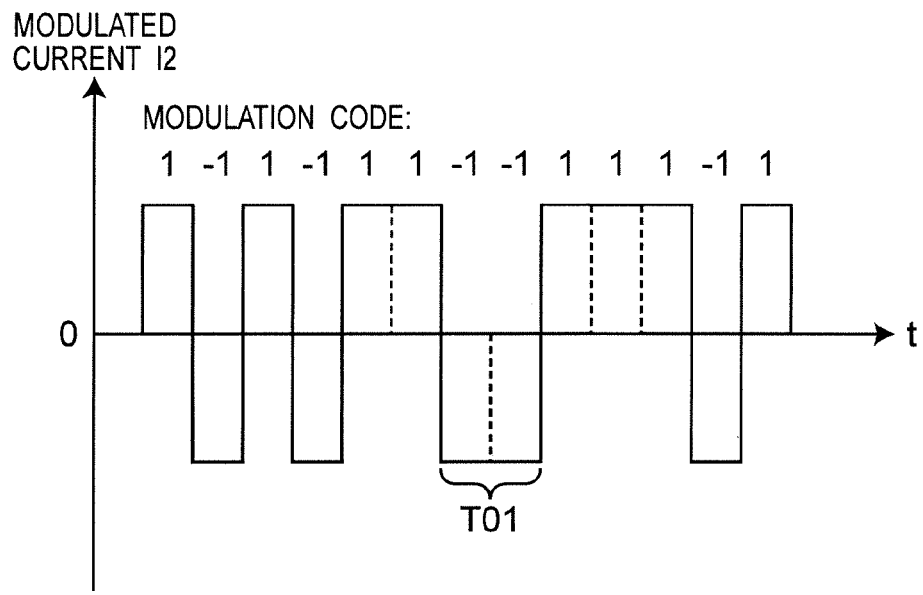
FIG. 2 is a waveform diagram showing an exemplary signal waveform of a modulated current I2 of the power transmission system of FIG. 1.

FIG. 2 is a waveform diagram showing an exemplary signal waveform of the modulated current I2 of the power transmission system of FIG. 1. In addition, FIG. 3 is a waveform diagram showing an exemplary signal waveform of a modulated current I2 of a communication system according to a comparison example.

The code modulator 2 of FIG. 1 modulates a current of power, which is generated by the power generator 1, by code modulation using a modulation code based on a predetermined code sequence. In this case, the code modulator 2 generates an alternating-current code-modulated wave made of currents flowing in directions corresponding to code values of "1" and "−1", respectively, as shown in FIG. 2. This code-modulated wave can transmit power in both periods of positive current flows, and periods of negative current flows (e.g., period T01 of FIG. 2). While the first embodiment indicates an example in which direct-current power is modulated by code modulation, alternating-current power may be modulated by code modulation as in a second embodiment described below.

Figure 3:
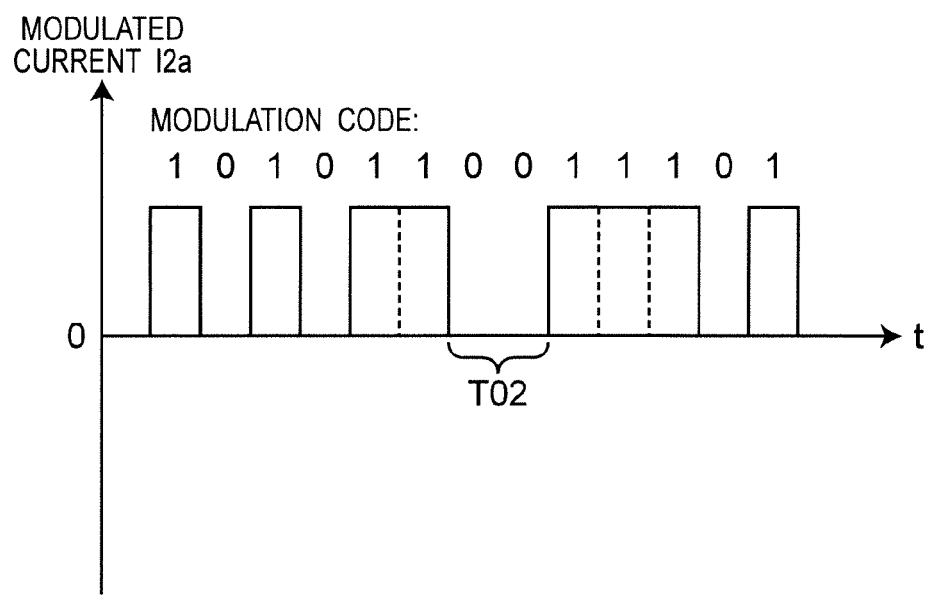
FIG. 3 is a waveform diagram showing an exemplary signal waveform of a modulated current I2 of a communication system according to a comparison example.

In the data transmission system according to the comparison example, e.g., to be used for communication, code values of "1" and "0" are typically used for code modulation, as shown in FIG. 3. However, according to the code-modulated wave as shown in FIG. 3, when the code value of the modulation code is "0" (e.g., period T02 of FIG. 3), a modulated current or voltage becomes zero, that is, a period of no power transmission occurs. Such periods of no power transmission may reduce overall power transmission efficiency. More specifically, for the case of communication, since information such as data should be transmitted in an accurately synchronized manner, it is only required that the code demodulator accurately distinguish between "0" and "1". On the other hand, for the case of power transmission, a power loss due to the period of no power transmission is not permissible from a viewpoint of efficiency in use of energy. Accordingly, by using an alternating-current code-modulated wave flowing in directions corresponding to the code values of "1" and "−1", respectively, as shown in FIG. 2, it is possible to transmit power with higher transmission efficiency than that of the comparison example.

Figure 4:
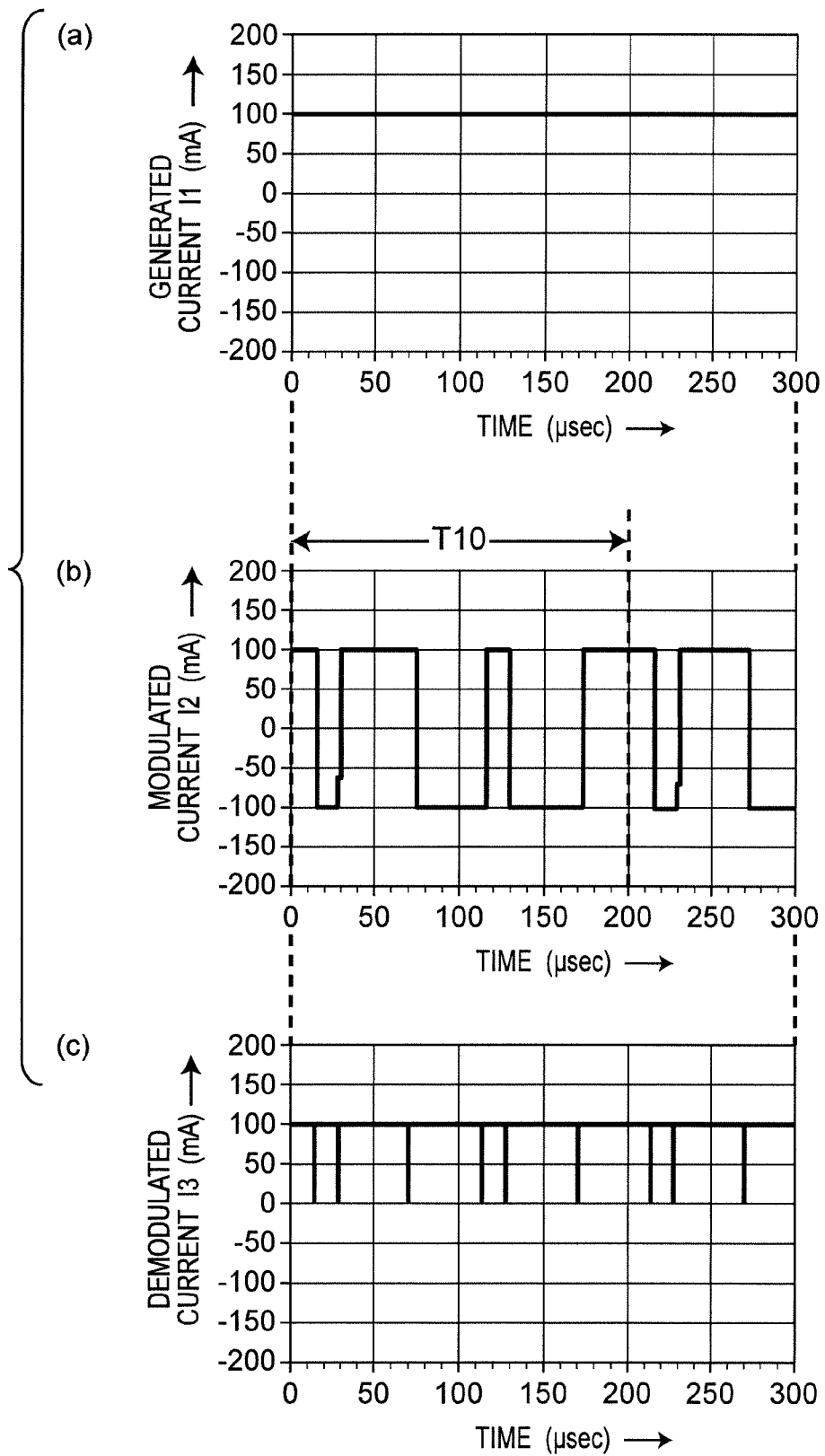
FIG. 4 is a waveform diagram showing exemplary signal waveforms in the power transmission system of FIG. 1, in which: (a) shows a signal waveform of a generated current I1; (b) shows a signal waveform of a modulated current I2; and (c) shows a signal waveform of a demodulated current I3.

FIG. 4 is a waveform diagram, where (a) to (c) show exemplary signal waveforms in the power transmission system of FIG. 1. In FIG. 4, (a) shows a signal waveform of the generated current I1, (b) shows a signal waveform of the modulated current I2, and (c) shows a signal waveform of the demodulated current I3. The power generator 1 generates the direct-current generated current I1. The code modulator 2 multiplies the generated current I1 by a modulation code m0 to generate the alternating-current modulated current I2. The code demodulator 4 multiplies the modulated current I2 by a demodulation code d0 identical to the modulation code m0 to reproduce the direct-current power generated by the power generator 1, and supply the reproduced direct-current power to the load 5.

Referring to FIG. 4, T10 indicates a period of one cycle of the modulation code m0 and the demodulation code d0. The same also applies to subsequent drawings.

According to the exemplary signal waveform of FIG. 4, the direct-current generated current I1 (FIG. 4(a)) is multiplied by the modulation code m0 having a frequency of 35 kHz, to generate the modulated current I2 (FIG. 4(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". The code value "1" of the modulation code m0 indicates that the code modulator 2 outputs a current in the same direction as the direction of an inputted current, and the code value "−1" of the modulation code m0 indicates that the code modulator 2 outputs a current in the direction opposite to the direction of the inputted current. Similarly, the code value "1" of the demodulation code d0 indicates that the code demodulator 4 outputs a current in the same direction as the direction of an inputted current, and the code value "−1" of the demodulation code d0 indicates that the code demodulator 4 outputs a current in the direction opposite to the direction of the inputted current.

For example, the modulation code m0 and the demodulation code d0 are given as follows.

$$m0 = [1\ -1\ 1\ 1\ 1\ -1\ -1\ -1\ 1\ -1\ -1\ -1\ 1\ 1] \tag{1}$$

$$d0 = m0 = [1\ -1\ 1\ 1\ 1\ -1\ -1\ -1\ 1\ -1\ -1\ -1\ 1\ 1] \tag{2}$$

Subsequently, the modulated current I2 of the code-modulated wave generated by the modulation code m0 is multiplied by the demodulation code d0.

This multiplication is denoted as follows.

$$m0 \times d0 = [1\ 1\ 1\ 1\ 1\ 1\ 1\ 1\ 1\ 1\ 1\ 1\ 1\ 1] \tag{3}$$

As apparent from Mathematical Expression (3), the demodulated current I3 (FIG. 4(c)) is obtained, which is direct current similarly to the original generated current I1.

As described above, it is possible to achieve direct-current power transmission in an accurately synchronized manner, without power loss, by using the code modulator 2 and the code demodulator 4 according to the present embodiment. In addition, it is possible to achieve efficient power transmission for a longer period, for example, by repeatedly using the modulation code m0 and demodulation code d0 as described above.

Further, the modulation code m0 can be divided into its former-half code portion m0a, and its latter-half code portion m0b, as follows.

$$m0a = [1\ -1\ 1\ 1\ 1\ -1\ -1] \tag{4}$$

$$m0b = [-1\ 1\ -1\ -1\ -1\ 1\ 1] \tag{5}$$

In this case, the code portion m0b is generated by inverting the sign of the code value of each bit of the code portion m0a. More specifically, when the code value of a certain bit of the code portion m0a is "1", the code value of a corresponding bit of the code portion m0b is "−1". Similarly, when the code value of a certain bit of the code portion m0a is "−1", the code value of a corresponding bit of the code portion m0b is "1".

Figure 5:
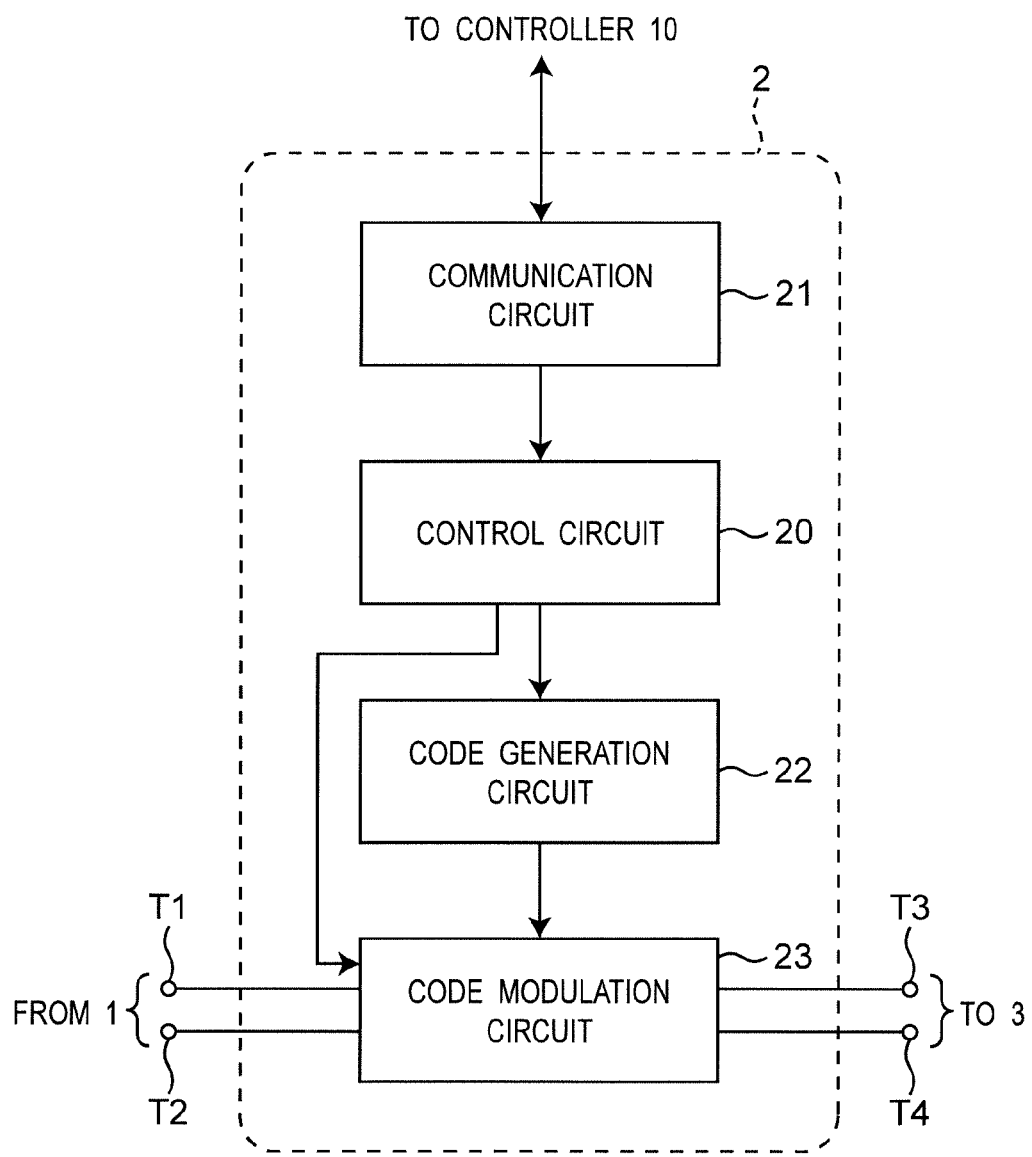
FIG. 5 is a block diagram showing a configuration of a code modulator 2 of FIG. 1.

FIG. 5 is a block diagram showing a configuration of the code modulator 2 of FIG. 1. Referring to FIG. 5, the code modulator 2 is provided with a control circuit 20, a communication circuit 21, a code generation circuit 22, and a code modulation circuit 23. The communication circuit 21 receives a synchronization signal and a control signal from the controller 10, the control signal including a code sequence itself or information specifying the code sequence, and outputs the received signals to the control circuit 20. In this case, the synchronization signal may be, for example, trigger signals to start and end modulation, or time information indicating a start time and an end time of modulation. Based on the control signal, the control circuit 20 controls the code generation circuit 22 so as to generate a modulation code based on a code sequence and output the modulation code to the code modulation circuit 23, and controls start and end of operation of the code modulation circuit 23. The code modulation circuit 23 has input terminals T1 and T2 connected to the power generator 1, and output terminals T3 and T4 connected to the transmission path 3.

Figure 6:
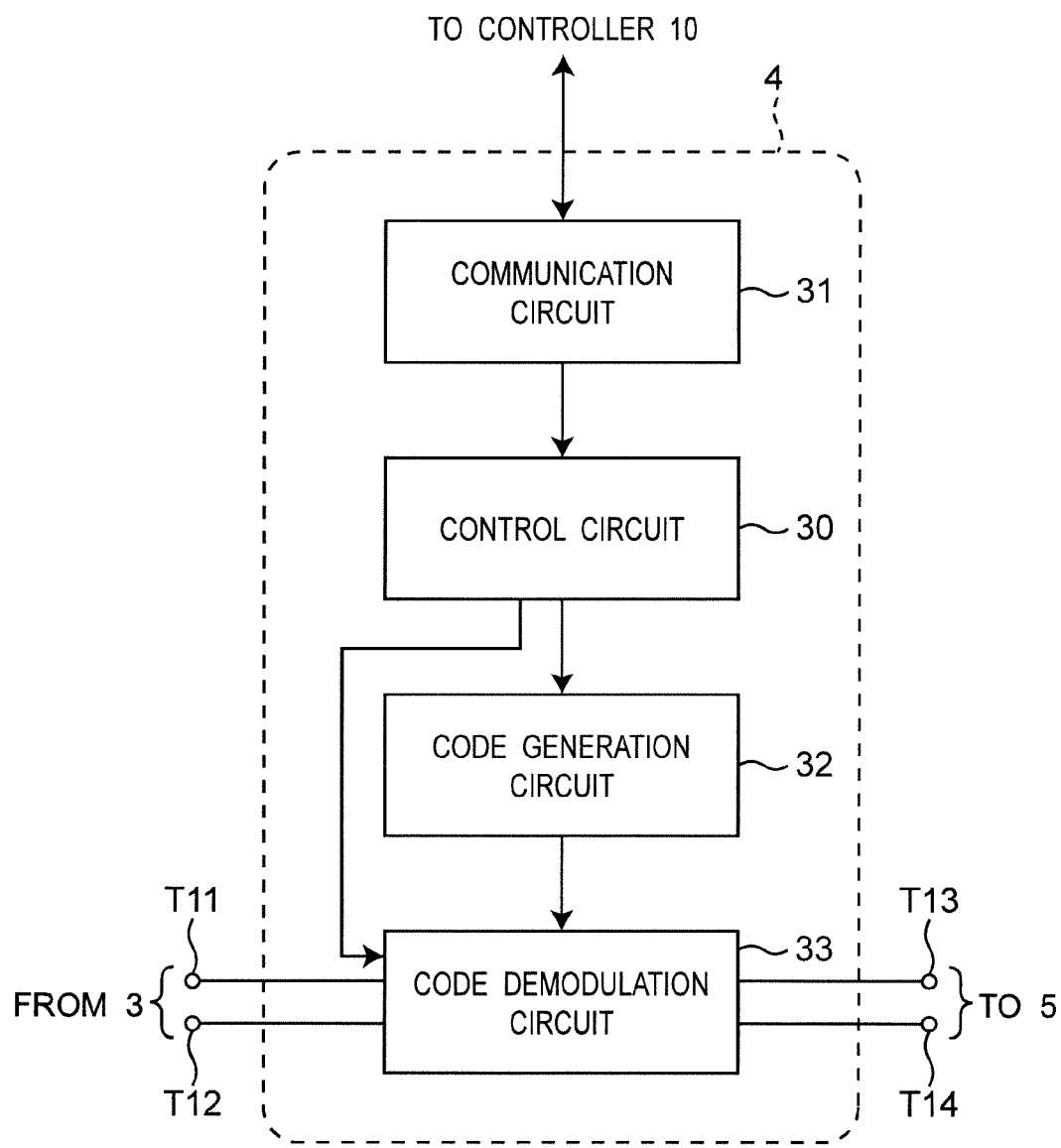
FIG. 6 is a block diagram showing a configuration of a code demodulator 4 of FIG. 1.

FIG. 6 is a block diagram showing a configuration of the code demodulator 4 of FIG. 1. Referring to FIG. 6. The code demodulator 4 is provided with a control circuit 30, a communication circuit 31, a code generation circuit 32, and a code demodulation circuit 33. The communication circuit 31 receives a synchronization signal and a control signal from the controller 10, the control signal including a code sequence itself or information specifying the code sequence, and outputs the received signals to the control circuit 30. In this case, the synchronization signal may be, for example, trigger signals to start and end demodulation, or time information indicating a start time and an end time of demodulation. Based on the control signal, the control circuit 30 controls the code generation circuit 32 so as to generate a demodulation code based on a code sequence and output the demodulation code to the code demodulation circuit 33, and controls start and end of operation of the code demodulation circuit 33. The code demodulation circuit 33 has input terminals T11 and T12 connected to the transmission path 3, and output terminals T13 and T14 connected to the load 5.

Note that in the power transmission system of FIG. 1, the control signals from the controller 10 to the code modulator 2 and the code demodulator 4 may be transmitted via control signal lines different from the transmission path 3, or may be transmitted via the transmission path 3 in a manner multiplexed with the code-modulated wave using some multiplexing scheme. In the latter case, it is possible to omit cables provided for communication from the controller 10 to the code modulator 2 and the code demodulator 4, and reduce cost.

Figure 7:
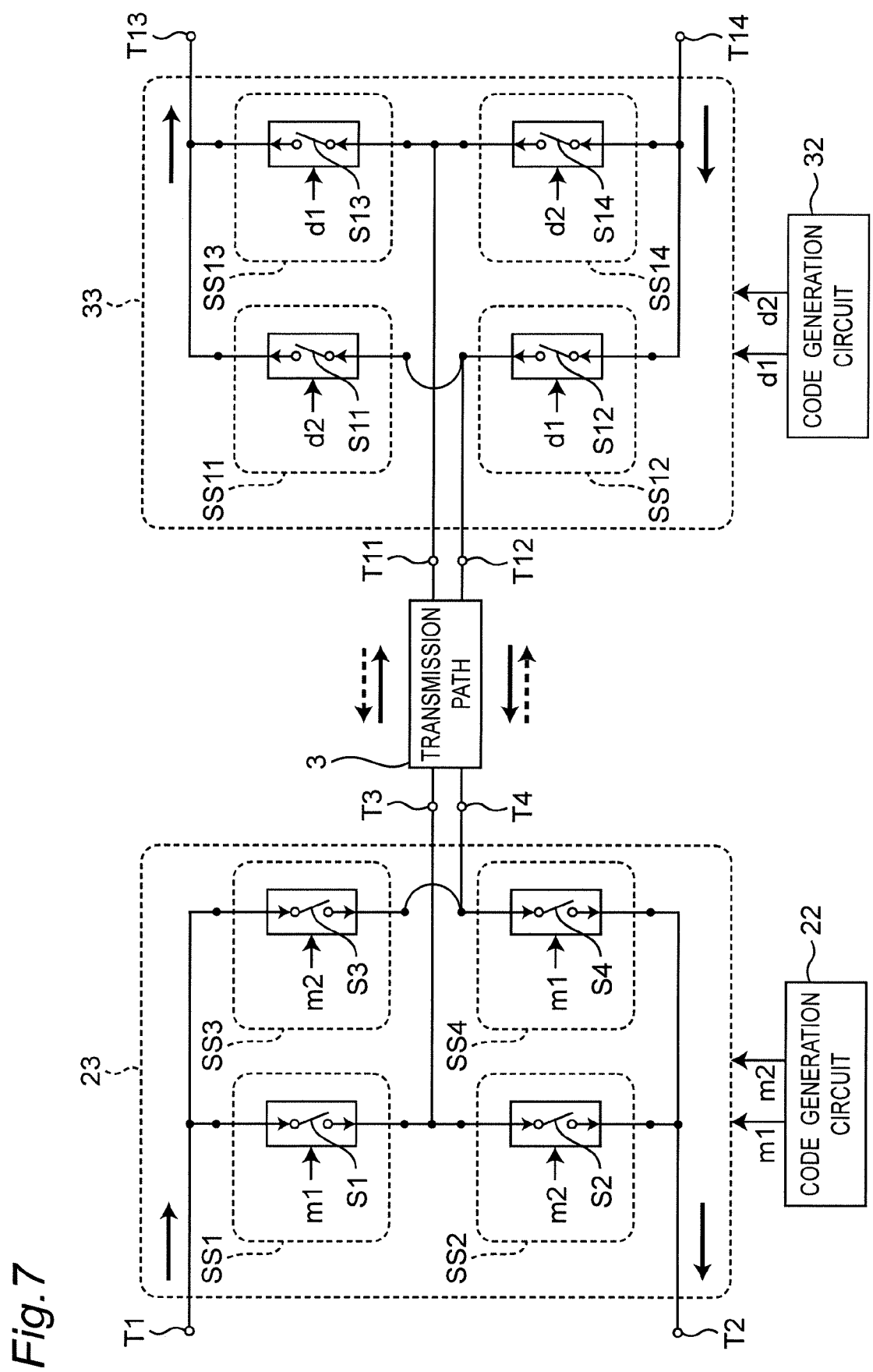
FIG. 7 is a block diagram showing configurations of a code modulation circuit 23 and a code demodulation circuit 33 of FIG. 1.

FIG. 7 is a block diagram showing configurations of the code modulation circuit 23 and the code demodulation circuit 33 of FIG. 1. Referring to FIG. 7, the code modulation circuit 23 is provided with four switch circuits SS1 to SS4 connected in a bridge configuration. The switch circuits SS1 to SS4 include unidirectional switch elements S1 to S4, respectively, each made of, for example, a metal-oxide-semiconductor (MOS) transistor. In addition, the code demodulation circuit 33 is provided with four switch circuits SS11 to SS14 connected in a bridge configuration. The switch circuits SS11 to SS14 include unidirectional switch elements S11 to S14, respectively, each made of, for example, an MOS transistor.

The code generation circuit 22 generates and outputs the modulation codes m1 and m2 to the code modulation circuit 23 under control of the control circuit 20, in order to operate the code modulator 2 according to the modulation code m0 as described above. The switch elements S1 and S4 of the code modulation circuit 23 are controlled according to the modulation code m1, and the switch elements S2 and S3 of the code modulation circuit 23 are controlled according to the modulation code m2. Each of the modulation codes m1 and m2 has code values "1" and "0". For example, when a signal of the code value "1" is inputted to each of the switch elements S1 to S4, each of the switch elements S1 to S4 is turned on. When a signal of the code value "0" is inputted to each of the switch elements S1 to S4, each of the switch elements S1 to S4 is turned off. Note that switch elements other than the switch elements S1 to S4 described in the present description operate in a similar manner. In this case, the switch elements S1 to S4 have directionality as follows. When the switch element S1 is turned on, the switch element S1 outputs a generated current inputted from the terminal T1, to the terminal T3. When the switch element S3 is turned on, the switch element S3 outputs a generated current inputted from the terminal T1, to the terminal T4. When the switch element S2 is turned on, the switch element S2 outputs a modulated current inputted from the terminal T3, to the terminal T2. When the switch element S4 is turned on, the switch element S4 outputs a modulated current inputted from the terminal T4, to the terminal T2.

The code generation circuit 32 generates and outputs the demodulation codes d1 and d2 to the code demodulation circuit 33 under control of the control circuit 30, in order to operate the code demodulator 4 according to the demodulation code d0 as described above. The switch elements S11 and S14 of the code demodulation circuit 33 are controlled according to the demodulation code d2, and the switch elements S12 and S13 of the code demodulation circuit 33 are controlled according to the demodulation code d1. Each of the demodulation codes d1 and d2 has code values "1" and "0". In this case, the switch elements S11 to S14 have directionality as described below. When the switch element S11 is turned on, the switch element S11 outputs a modulated current inputted from the terminal T12, to the terminal T13. When the switch element S13 is turned on, the switch element S13 outputs a modulated current inputted from the terminal T11, to the terminal T13. When the switch element S12 is turned on, the switch element S12 outputs a demodulated current inputted from the terminal T14, to the terminal T12. When the switch element S14 is turned on, the switch element S14 outputs a demodulated current inputted from the terminal T14, to the terminal T11.

In the notation of FIG. 7, directions of current flows in the switch elements S11 to S14 of the code demodulator 4 are opposite to directions of current flows in the switch elements S1 to S4 of the code modulator 2.

Figure 8A:
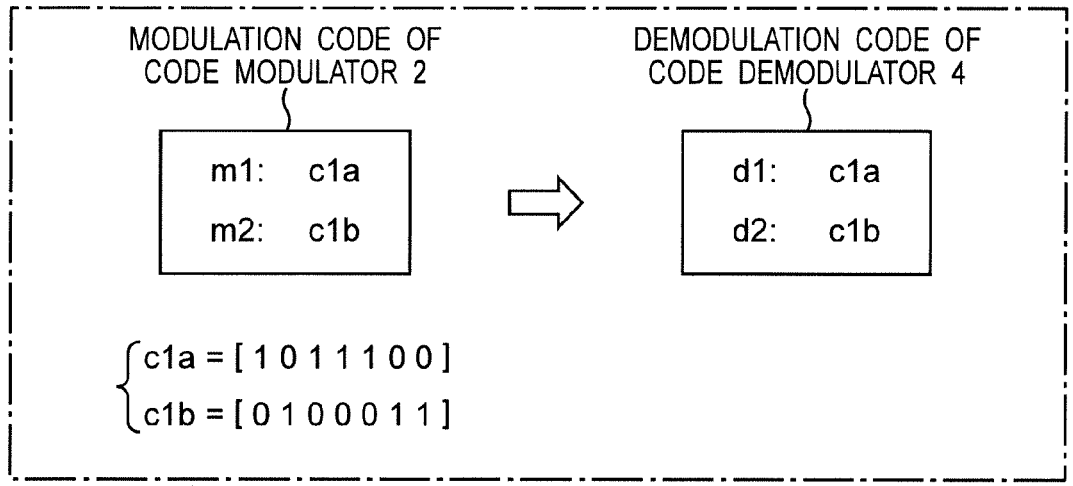
FIG. 8A is a diagram showing an example of a modulation code of the code modulator 2 and a demodulation code of the code demodulator 4 in the power transmission system of FIG. 1, as a first implementation example in which direct-current power is transmitted and received.

FIG. 8A is a diagram showing an example of a modulation code of the code modulator 2 and a demodulation code of the code demodulator 4 in the power transmission system of FIG. 1, as a first implementation example in which direct-current power is transmitted and received. More specifically, FIG. 8A shows an example of the modulation codes m1 and m2 inputted to the switch elements S1 to S4 of the code modulator 2, and the demodulation codes d1 and d2 inputted to the switch elements S11 to S14 of the code demodulator 4.

As shown in FIG. 8A, the modulation code m1 and the demodulation code d1 are identical to each other, and each is made of a code sequence c1a. In addition, the modulation code m2 and the demodulation code d2 are identical to each other, and each is made of a code sequence c1b. In addition, the code sequences c1a and c1b are configured such that when the code value of a certain bit of the code sequence c1a is "1", the code value of a corresponding bit of the code sequence c1b is "0"; and when the code value of a certain bit of the code sequence c1a is "0", the code value of a corresponding bit of the code sequence c1b is "1".

Accordingly, among the switch elements S1 to S4 and S11 to S14 of FIG. 7, when a switch element receiving the code value of a certain bit of the code sequence c1a is turned on, the switch element receiving the code value of a corresponding bit of the code sequence c1b is turned off. In addition, when the switch element receiving the code value of a certain bit of the code sequence c1a is turned off, the switch element receiving the code value of a corresponding bit of the code sequence c1b is turned on.

According to the code modulation circuit 23 of FIG. 7, when the switch elements S1 and S4 are turned on, the switch elements S2 and S3 are turned off; and when the switch elements S1 and S4 are turned off, the switch elements S2 and S3 are turned on. Thus, when the switch elements S1 and S4 are turned on, and the switch elements S2 and S3 are turned off, the modulated current I2 flows in the transmission path 3 in a positive direction, i.e., in a direction of solid arrows. On the other hand, when the switch elements S1 and S4 are turned off, and the switch elements S2 and S3 are turned on, the modulated current I2 flows in the transmission path 3 in a negative direction, i.e., in a direction of dotted arrows. Accordingly, as shown in FIG. 4, when the direct-current generated current I1 is inputted to the code modulator 2, the alternating-current modulated current I2 can be transmitted to the transmission path 3.

In the code demodulation circuit 33 of FIG. 7, the switch elements S11 to S14 are turned on or off in response to the demodulation codes d1 and d2 in synchronization with the code modulation circuit 23. In this case, the switch elements S12 and S13 are turned on or off in accordance with the demodulation code d1 identical to the modulation code m1, and the switch elements S11 and S14 are turned on or off in accordance with the demodulation code d2 identical to the modulation code m2. Thus, when the code value of the modulation code m1 is "1", and the code value of the modulation code m2 is "0", i.e., when the modulated current I2 flows in the transmission path 3 in the positive direction, the code value of the demodulation code d1 is "1", and the code value of the demodulation code d2 is "0". Accordingly, by turning on the switch elements S13 and S12 and turning off the switch elements S11 and S14, the demodulated current I3 flows at the output terminals T13 and T14 of the code demodulation circuit 33 in the positive direction, i.e., in the direction of the solid arrows. On the other hand, when the code value of the modulation code m1 is "0", and the code value of the modulation code m2 is "1", i.e., when the modulated current I2 flows in the transmission path 3 in the negative direction, the code value of the demodulation code d1 is "0", and the code value of the demodulation code d2 is "1". Accordingly, by turning on the switch elements S11 and S14 and turning off the switch elements S12 and S13, the demodulated current I3 again flows at the output terminals T13 and T14 of the code demodulation circuit 33 in the positive direction, i.e., in the direction of the solid arrows.

As described above, when using the modulation codes m1 and m2 and the demodulation codes d1 and d2 of FIG. 8A, equivalently, the code modulator 2 operates according to the modulation code m0 of Mathematical Expression (1), and the code demodulator 4 operates according to the demodulation code d0 of Mathematical Expression (2).

As described above, according to FIGS. 7 and 8A, when the direct-current generated current I1 is inputted to the code modulator 2, it is possible to extract the demodulated current I3 from the code demodulator 4, the demodulated current I3 being also a direct current similarly to the generated current I1 inputted to the code modulator 2. Therefore, according to the first embodiment, it is possible to modulate the direct-current generated current I1 by code modulation into the alternating-current modulated current I2, and then, transmit the modulated current I2 via the transmission path 3, and then, demodulate the modulated current I2 into the direct-current demodulated current I3.

Figure 8B:
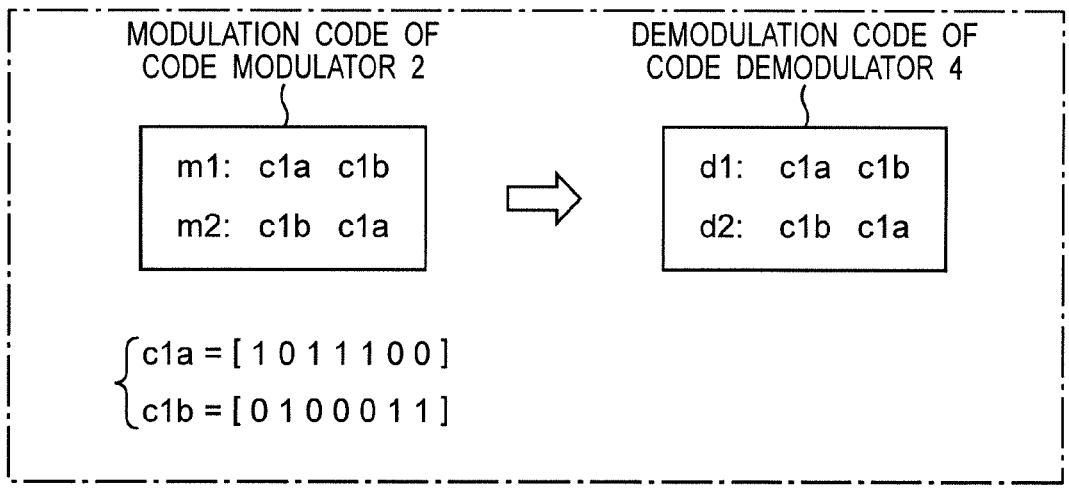
FIG. 8B is a diagram showing an example of a modulation code of the code modulator 2 and a demodulation code of the code demodulator 4 in the power transmission system of FIG. 1, as a second implementation example in which direct-current power is transmitted and received.

FIG. 8B is a diagram showing an example of a modulation code of the code modulator 2 and a demodulation code of the code demodulator 4 in the power transmission system of FIG. 1, as a second implementation example in which direct-current power is transmitted and received. When in each of the code sequences c1a and c1b, the number of bits of the code value "1" is equal to the number of bits of the code value "0", the modulated current I2 being modulated by code modulation and flowing in the transmission path 3 includes, in average, no direct-current component, but includes only an alternating-current component. However, in some code sequence, the number of bits of the code value "1" is different from the number of bits of the code value "0", and thus, a direct-current component occurs. When using such a code sequence, by concatenating the code sequence with a code sequence of bits having code values inverted from those of corresponding bits, respectively, it is possible to generate a modulation code and a demodulation code, in each of which the number of bits of the code value "1" is equal to the number of bits of the code value "0". According to the example of FIG. 8B, each of the modulation code m1 and the demodulation code d1 is a code sequence [c1a c1b] which is a concatenation of the code sequence c1a and the code sequence c1b, and each of the modulation code m2 and the demodulation code d2 is a code sequence [c1b c1a] which is a concatenation of the code sequence c1b and the code sequence c1a. As a result, the average value of the code-modulated current I2 flowing in the transmission path 3 becomes zero, and the modulated current I2 includes only an alternating-current component.

Note that the power generator 1 or the load 5 may be a power storage apparatus, such as a battery and a capacitor. When a power storage apparatus is incorporated in the power transmission system according to the present embodiment, it is possible to effectively utilize power generated during hours of low or no power consumption, and thus, improve overall power efficiency.

Second Embodiment

In the first embodiment, we have described the power transmission system which modulates and transmits a direct-current generated current by code modulation. Meanwhile, in a second embodiment, we describe a power transmission system which modulates and transmits an alternating-current generated current by code modulation.

The power transmission system according to the second embodiment is provided with a code modulator 2A and a code demodulator 4A, which will be described below with reference to FIGS. 10 and 11, in place of the code modulator 2 and the code demodulator 4 of FIG. 1. The other portions of the power transmission system according to the second embodiment are configured in a manner similar to that of the power transmission system according to the first embodiment.

Figure 9:
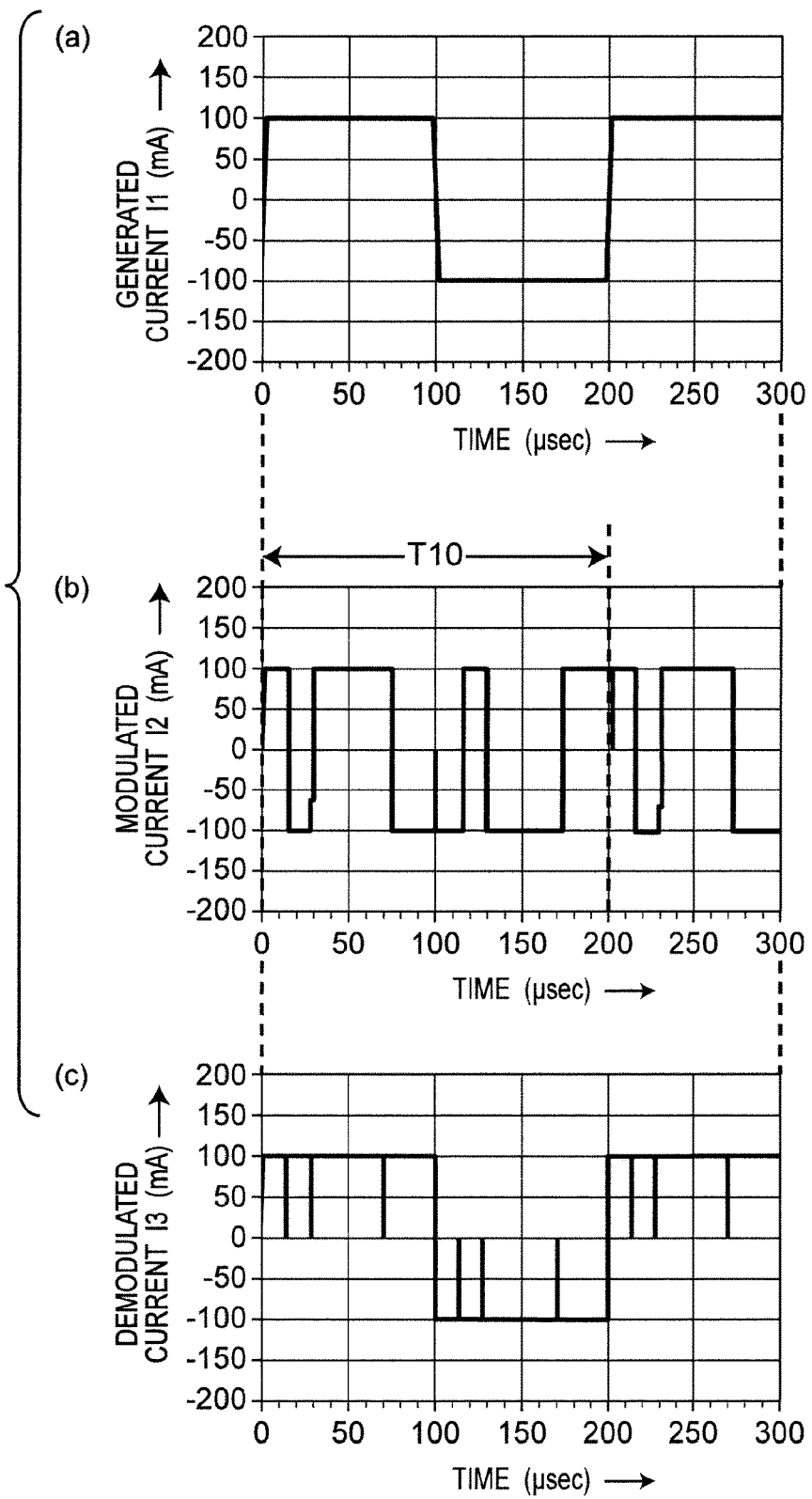
FIG. 9 is a waveform diagram showing exemplary signal waveforms in the power transmission system according to a second embodiment, in which: (a) shows a signal waveform of a generated current I1; (b) shows a signal waveform of a modulated current I2; and (c) shows a signal waveform of a demodulated current I3.

FIG. 9 is a waveform diagram, where (a) to (c) show exemplary signal waveforms in the power transmission system according to the second embodiment. In FIG. 9, (a)

shows a signal waveform of a generated current I1; (b) shows a signal waveform of a modulated current I2; and (c) shows a signal waveform of a demodulated current I3. More specifically, FIG. 9 shows exemplary signal waveforms generated as follows: the code modulator 2A modulates the alternating-current generated current I1 by code modulation, and then, the modulated current I2 is transmitted via a transmission path 3, and then, the code demodulator 4A demodulates the modulated current I2 by code demodulation.

The power generator 1 generates the alternating-current generated current I1. For example, the alternating-current generated current I1 has a rectangular waveform at a frequency of 5 kHz, which cyclically repeats positive and negative periods every 200 microseconds. Also in this case, the code modulator 2A multiplies the generated current I1 by a modulation code m0 to generate the alternating modulated current I2, in a manner similar to the code modulation of the direct-current generated current I1 as shown in FIG. 4. The code demodulator 4A multiplies the modulated current I2 by a demodulation code d0 identical to the modulation code m0 to reproduce the alternating-current power generated by the power generator 1, and supply the reproduced alternating-current power to a load 5.

The frequency of the modulation code m0 and the demodulation code d0 is set to frequencies higher than the frequency of the generated current I1 and the frequency of the demodulated current I3. According to the exemplary signal waveform of FIG. 9, the alternating-current generated current I1 (FIG. 9(a)) is multiplied by the modulation code m0 having a frequency of 35 kHz to generate the modulated current I2 (FIG. 9(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". In case of transmission of the alternating-current generated current I1, the meaning of the code value "1" or "−1" in a period when the generated current I1 is positive (period from 0 to 100 microsecond in FIG. 9(a)) is different from that of a period when the generated current I1 is negative (period from 100 to 200 microsecond in FIG. 9(a)). In the period when the generated current I1 is positive, the code value "1" of the modulation code m0 indicates that the code modulator 2A outputs a current in the same direction as the direction of an inputted current, and the code value "−1" of the modulation code m0 indicates that the code modulator 2A outputs a current in the direction opposite to the direction of an inputted current. Similarly, in the period when the generated current I1 is positive, the code value "1" of the demodulation code d0 indicates that the code demodulator 4A outputs a current in the same direction as the direction of an inputted current, and the code value "−1" of the demodulation code d0 indicates that the code demodulator 4A outputs a current in the direction opposite to the direction of an inputted current. In the period when the generated current I1 is negative, the code value "1" of the modulation code m0 indicates that the code modulator 2A outputs a current in the direction opposite to the direction of an inputted current, and the code value "−1" of the modulation code m0 indicates that the code modulator 2A outputs a current in the same direction as the direction of an inputted current. Similarly, in the period when the generated current I1 is negative, the code value "1" of the demodulation code d0 indicates that the code demodulator 4A outputs a current in the direction opposite to the direction of an inputted current, and the code value "−1" of the demodulation code d0 indicates that the code demodulator 4A outputs a current in the same direction as the direction of an inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1] \quad (6)$$

$$d0=m0=[1\ -1\ 1\ 1\ 1\ -1\ -1\ -1\ 1\ -1\ -1\ -1\ 1\ 1] \quad (7)$$

Similarly to the code demodulation according to the first embodiment, the modulated current I2 of the code-modulated wave generated by the modulation code m0 is multiplied by the demodulation code d0. This multiplication is denoted as follows.

$$m0 \times d0=[1\ 1\ 1\ 1\ 1\ 1\ 1\ 1\ 1\ 1\ 1\ 1\ 1\ 1] \quad (8)$$

As apparent from Mathematical Expression (8), the demodulated current I3 (FIG. 8(c)) is obtained, which is an alternating current similarly to the original generated current I1.

As described above, it is possible to achieve power transmission in an accurately synchronized manner, without power loss, by using the method of code modulation and code demodulation according to the present embodiment. In addition, it is possible to achieve efficient power transmission for a longer period, for example, by repeatedly using the modulation code m0 and demodulation code d0 as described above.

Figure 10:
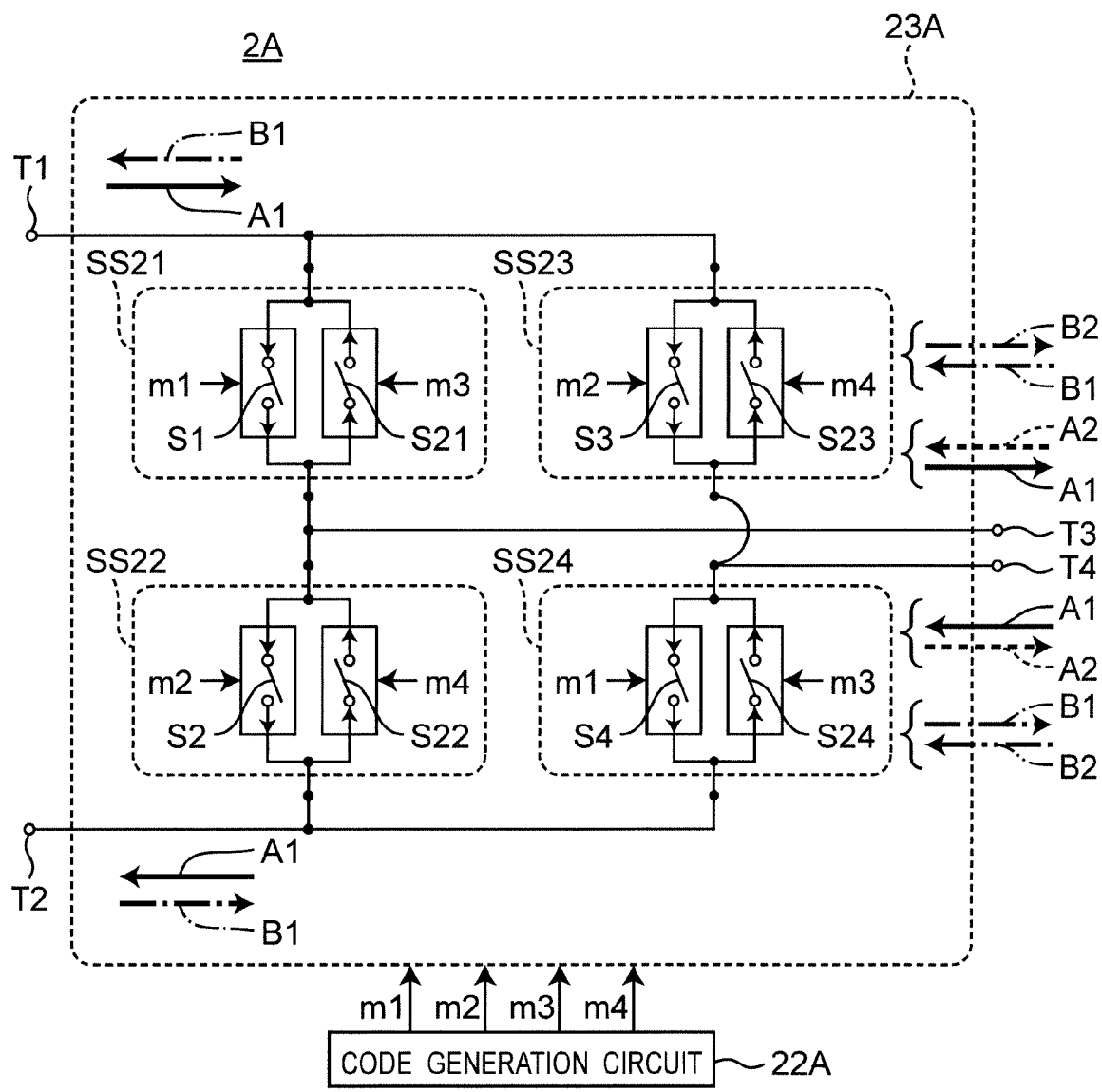
FIG. 10 is a block diagram showing a partial configuration of a code modulator 2A of the power transmission system according to the second embodiment.

FIG. 10 is a block diagram showing a partial configuration of the code modulator 2A of the power transmission system according to the second embodiment. The code modulator 2A of FIG. 10 is provided with a code generation circuit 22A and a code modulation circuit 23A, in place of the code generation circuit 22 and the code modulation circuit 23 of FIG. 5. The code modulator 2A of FIG. 10 is further provided with a control circuit 20 and a communication circuit 21 similarly to the code modulator 2 of FIG. 5, which are omitted in FIG. 10 for ease of illustration.

The code generation circuit 22A and the code modulation circuit 23A of FIG. 10 are different from the code generation circuit 22 and the code modulation circuit 23 of FIG. 7 in following points.

(1) The code generation circuit 22A generates four modulation codes m1 to m4 in place of the two modulation codes m1 and m2, and outputs the generated modulation codes m1 to m4 to the code modulation circuit 23A.

(2) The code modulation circuit 23A is provided with four bidirectional switch circuits SS21 to SS24 connected in a bridge configuration, in place of the unidirectional switch circuits SS1 to SS4.

The code generation circuit 22A generates and outputs the modulation codes m1 to m4 to the code modulation circuit 23A under control of the control circuit 20, in order to operate the code modulator 2A according to the modulation code m0 as described above. Each of the modulation codes m1 to m4 has code values "1" and "0".

In the code modulation circuit 23A, the switch circuit SS21 is provided with the switch element S1 of FIG. 7 to be turned on and off in response to the modulation code m1, and further provided with a switch element S21 having directionality opposite to that of the switch element S1, connected in parallel to the switch element S1, and to be turned on and off in response to the modulation code m3. The switch circuit SS22 is provided with the switch element S2 of FIG. 7 to be turned on and off in response to the modulation code m2, and further provided with a switch element S22 having directionality opposite to that of the switch element S2, connected in parallel to the switch element S2, and to be turned on and off in response to the modulation code m4. The switch circuit SS23 is provided with the switch element S3 of FIG. 7 to be turned on and off in response to the modulation code m2, and further provided with a switch element S23 having directionality opposite to that of the switch element S3, connected in parallel to the switch element S3, and to be turned on and off in response to the modulation code m4. The switch circuit SS24 is provided with the switch element S4 of FIG. 7 to be turned on and off in response to the modulation code m1, and further provided with a switch element S24 having directionality opposite to that of the switch element S4, connected in parallel to the switch element S4, and to be turned on and off in response to the modulation code m3. Each of the switch elements S21 to S24 is made of, for example, an MOS transistor. The code modulation circuit 23A has terminals T1 and T2 connected to a power generator 1, and terminals T3 and T4 connected to the transmission path 3. Alternating-current power is inputted from the power generator 1 to the code modulation circuit 23A. The code modulation circuit 23A modulates the alternating-current power by code modulation, and then, outputs a code-modulated wave to the transmission path 3.

Figure 11:
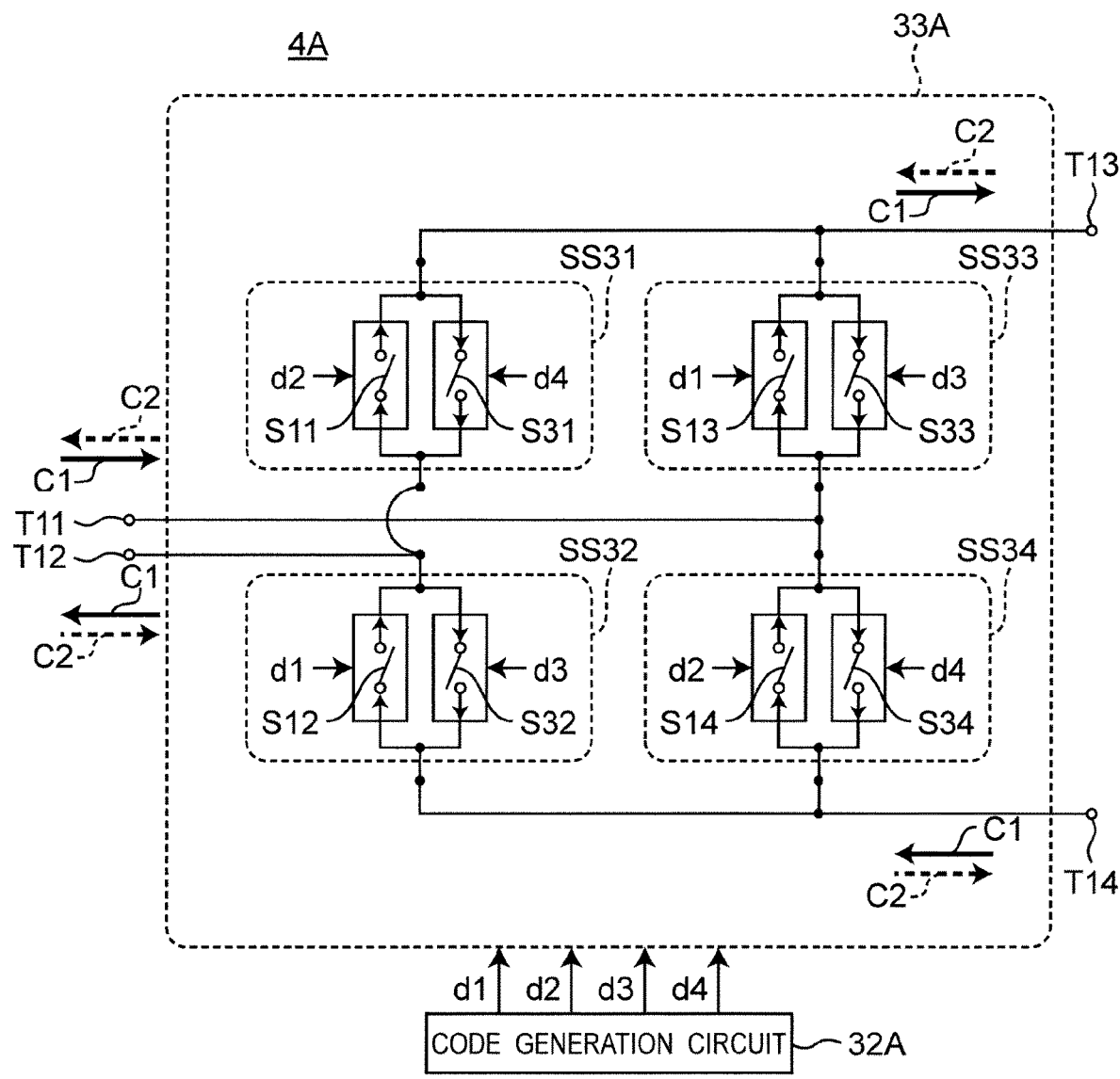
FIG. 11 is a block diagram showing a partial configuration of a code demodulator 4A of the power transmission system according to the second embodiment.

FIG. 11 is a block diagram showing a partial configuration of the code demodulator 4A of the power transmission system according to the second embodiment. The code demodulator 4A of FIG. 11 is provided with a code generation circuit 32A and a code demodulation circuit 33A, in place of the code generation circuit 32 and the code demodulation circuit 33 of FIG. 6. The code demodulator 4A of FIG. 11 is further provided with a control circuit 30 and a communication circuit 31 similarly to the code demodulator 4 of FIG. 5, which are omitted in FIG. 11 for ease of illustration.

The code generation circuit 32A and the code demodulation circuit 33A of FIG. 11 are different from the code generation circuit 32 and the code demodulation circuit 33 of FIG. 7 in following points.

(1) The code generation circuit 32A generates four demodulation codes d1 to d4 in place of the two modulation codes d1 and d2, and outputs the generated demodulation codes d1 to d4 to the code demodulation circuit 33A.

(2) The code demodulation circuit 33A is provided with four bidirectional switch circuits SS31 to SS34 connected in a bridge configuration, in place of the unidirectional switch circuits SS11 to SS14.

The code generation circuit 32A generates and outputs the demodulation codes d1 to d4 to the code demodulation circuit 33A under control of the control circuit 30, in order to operate the code demodulator 4A according to the demodulation code d0 as described above. Each of the demodulation codes d1 and d4 has code values "1" and "0".

In the code demodulation circuit 33A, the switch circuit SS31 is provided with the switch element S11 of FIG. 7 to be turned on and off in response to the demodulation code d2, and further provided with a switch element S31 having directionality opposite to that of the switch element S11, connected in parallel to the switch element S11, and to be turned on and off in response to the demodulation code d4. The switch circuit SS32 is provided with the switch element S12 of FIG. 7 to be turned on and off in response to the demodulation code d1, and further provided with a switch element S32 having directionality opposite to that of the switch element S12, connected in parallel to the switch element S12, and to be turned on and off in response to the demodulation code d3. The switch circuit SS33 is provided with the switch element S13 of FIG. 7 to be turned on and off in response to the demodulation code d1, and further provided with a switch element S33 having directionality opposite to that of the switch element S13, connected in parallel to the switch element S13, and to be turned on and off in response to the demodulation code d3. The switch circuit SS34 is provided with the switch element S14 of FIG. 7 to be turned on and off in response to the demodulation code d2, and further provided with a switch element S34 having directionality opposite to that of the switch element S14, connected in parallel to the switch element S14, and to be turned on and off in response to the demodulation code d4. Each of the switch elements S31 to S34 is made of, for example, an MOS transistor. The code demodulation circuit 33A has terminals T11 and T12 connected to the transmission path 3, and terminals T13 and T14 connected to the load 5. An alternating-current code-modulated wave is inputted from the transmission path 3 to the code demodulation circuit 33A. The code demodulation circuit 33A demodulates the code-modulated wave by code demodulation into alternating-current demodulated power, and then outputs the demodulated power to the load 5.

Figure 12A:
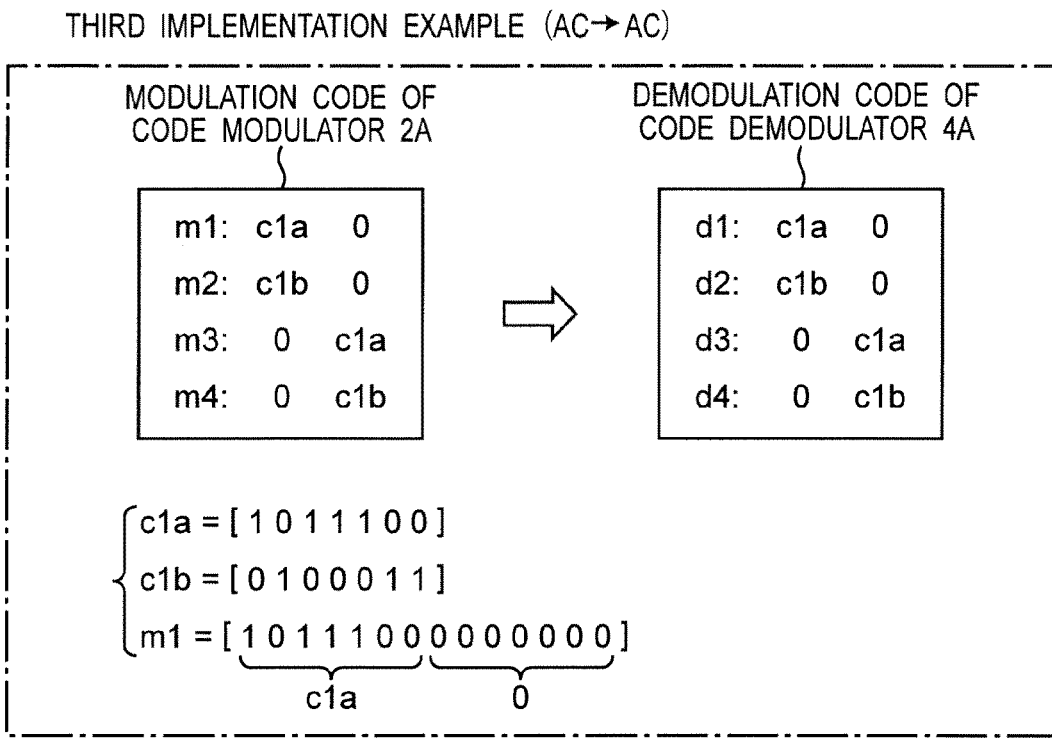
FIG. 12A is a diagram showing an example of a modulation code of the code modulator 2A and a demodulation code of the code demodulator 4A in the power transmission system according to the second embodiment, as a third implementation example in which alternating-current power is transmitted and received.

FIG. 12A is a diagram showing an example of a modulation code of the code modulator 2A and a demodulation code of the code demodulator 4A in the power transmission system according to the second embodiment, as a third implementation example in which alternating-current power is transmitted and received. More specifically, FIG. 12A shows an example of the modulation codes m1 to m4 inputted to the bidirectional switch circuits SS21 to SS24 of the code modulation circuit 23A, and the demodulation codes d1 to d4 inputted to the bidirectional switch circuits SS31 to SS34 of the code demodulation circuit 33A.

As shown in FIG. 12A, the modulation code m1 and the demodulation code d1 are identical to each other, and the modulation code m2 and the demodulation code d2 are identical to each other. Similarly, the modulation code m3 and the demodulation code d3 are identical to each other, and the modulation code m4 and the demodulation code d4 are identical to each other. In addition, similarly to the case of direct-current power transmission, code sequences c1a and c1b are configured such that when the code value of a certain bit of the code sequence c1a is "1", the code value of a corresponding bit of the code sequence c1b is "0"; and when the code value of a certain bit of the code sequence c1a is "0", the code value of a corresponding bit of the code sequence c1b is "1".

FIG. 12A shows a case in which the duration of the code sequence c1a and the code sequence c1b is set to be equal to a half of the cycle of the alternating-current generated current I1. In a period when the alternating-current generated current I1 flows in the positive direction (in example of FIG. 12A, former half period of each cycle), the modulation codes m1 and m2 are the code sequences c1a and c1b, respectively, and on the other hand, all code values of the modulation codes m3 and m4 are "0". In a period when the alternating-current generated current I1 flows in the negative direction (in example of FIG. 12A, latter half period of each cycle), all the code values of the modulation codes m1 and m2 are "0", and on the other hand, the modulation codes m3 and m4 are the code sequences c1a and c1b, respectively. Each of the modulation codes m1 to m4 for one cycle is generated by concatenating bits for a former half of each cycle with bits for a latter half of each cycle. Accordingly, in the former half of each cycle, the switch elements S1 to S4 are turned on and off according to the modulation codes m1 and m2, and on the other hand, the switch elements S21 to S24 are disconnected and no current flows. In addition, in the latter half of each cycle, the switch elements S1 to S4 are disconnected and no current flows, and on the other hand, the switch elements S21 to S24 are turned on and off according to the modulation codes m3 and m4. Similarly to the modulation codes m1 to m4, each of the demodulation codes d1 to d4 for one cycle is generated by concatenating bits for the former half of each cycle with bits for the latter half of each cycle.

Now, operation of the code modulation circuit 23A is described.

At first, operation is described for a case in which the generated current I1 flows at the input terminals T1 and T2 in the positive direction, i.e., in a direction of solid arrows A1. In this case, when the switch elements S1 and S4 receiving the code value "1" of the modulation code m1 are turned on, the switch elements S2 and S3 receiving the code value "0" of the modulation code m2 are turned off. In addition, when the switch elements S1 and S4 receiving the code value "0" of the modulation code m1 are turned off, the switch elements S2 and S3 receiving the code value "1" of the modulation code m2 are turned on. Thus, when the switch elements S1 and S4 are turned on, and the switch elements S2 and S3 are turned off, the modulated current I2 flows in the transmission path 3 in a positive direction, i.e., in a direction of the solid arrows A1. On the other hand, when the switch elements S1 and S4 are turned off, and the switch elements S2 and S3 are turned on, the modulated current I2 flows in the transmission path 3 in a negative direction, i.e., in a direction of dotted arrows A2. Accordingly, when the current of positive period of the alternating-current generated current I1 is inputted to the code modulation circuit 23A, it is possible to transmit the alternating-current modulated current I2 to the transmission path 3, as shown in FIG. 9($b$).

Next, operation is described for a case in which the generated current I1 flows at the input terminals T1 and T2 in a negative direction, i.e., in a direction of chain arrows B1. In this case, when the switch elements S21 and S24 receiving the code value "1" of the modulation code m3 are turned on, the switch elements S22 and S23 receiving the code value "0" of the modulation code m4 are turned off. In addition, when the switch elements S21 and S24 receiving the code value "0" of the modulation code m3 are turned off, the switch elements S22 and S23 receiving the code value "1" of the modulation code m4 are turned on. Thus, when the switch elements S21 and S24 are turned on, and the switch elements S22 and S23 are turned off, the modulated current I2 flows in the transmission path 3 in a negative direction, i.e., in a direction of the chain arrows B1. On the other hand, when the switch elements S21 and S24 are turned off, and the switch elements S22 and S23 are turned on, the modulated current I2 flows in the transmission path 3 in a positive direction, i.e., in a direction of two-dot chain arrows B2. Accordingly, when the current of negative period of the alternating-current generated current I1 is inputted to the code modulation circuit 23A, it is possible to transmit the alternating-current modulated current I2 to the transmission path 3, as shown in FIG. 9($b$).

As described with reference to FIG. 10, the code modulation circuit 23A can generate the alternating-current modulated current I2, as shown in FIG. 9($b$), in both the positive and negative periods of the alternating-current generated current I1.

Next, operation of the code demodulation circuit 33A of FIG. 11 is described.

At first, we consider a case in which the generated current I1 flows at the input terminals T1 and T2 of the code modulation circuit 23A in the positive direction, i.e., in the direction of the solid arrows A1. In this case, the alternating-current modulated current I2 flowing in the positive and negative directions is inputted to the input terminals T11 and T12 of the code demodulation circuit 33A via the transmission path 3. When the code demodulation circuit 33A correctly performs demodulation operation, the demodulated current I3 flows at the output terminals T13 and T14 of the code demodulation circuit 33A in a positive direction, i.e., in a direction of solid arrows C1. These operations are described below. In this case, all code values of the demodulation code d3 and the demodulation code d4 are "0", and all the switch elements S31 to S34 are turned off.

At first, operation of the code demodulation circuit 33A is described for a case in which the generated current I1 flows at the input terminals T1 and T2 of the code modulation circuit 23A in the positive direction, and the modulated current I2 flows at the input terminals T11 and T12 of the code demodulation circuit 33A in the positive direction, i.e., in the direction of the solid arrows C1. In this case, the code value of the code sequence c1$a$ is "1", and the code value of the code sequence c1$b$ is "0". Accordingly, the switch elements S12 and S13 receiving the code value "1" of the demodulation code d1 are turned on, and the switch elements S11 and S14 receiving the code value "0" of the demodulation code d2 are turned off. Therefore, the demodulated current I3 flows at the output terminals T13 and T14 in the positive direction, i.e., in the direction of the solid arrows C1.

Next, operation of the code demodulation circuit 33A is described for a case in which the generated current I1 flows at the input terminals T1 and T2 of the code modulation circuit 23A in the positive direction, and the modulated current I2 flows at the input terminals T11 and T12 of the code demodulation circuit 33A in the negative direction, i.e., in the direction of dotted arrows C2. In this case, the code value of the code sequence c1$a$ is "0", and the code value of the code sequence c1$b$ is "1". Accordingly, the switch elements S12 and S13 receiving the code value "0" of the demodulation code d1 are turned off, and the switch elements S11 and S14 receiving the code value "1" of the demodulation code d2 are turned on. Therefore, the demodulated current I3 flows at the output terminals T13 and T14 in the positive direction, i.e., in the direction of the solid arrows C1. Accordingly, when the current of positive period of the alternating-current generated current I1 is inputted to the code modulation circuit 23A, the code demodulation circuit 33A can output the demodulated current I3 which is correctly demodulated with positive polarity, to the load 5, as shown in FIG. 9($c$).

Next, we consider a case in which the generated current I1 flows at the input terminals T1 and T2 of the code modulation circuit 23A in the negative direction, i.e., in the direction of the chain arrows B1. Similarly to the above case, the alternating-current modulated current I2 flowing in the positive and negative directions is inputted to the input terminals T11 and T12 of the code demodulation circuit 33A via the transmission path 3. When the code demodulation circuit 33A correctly performs demodulation operation, the demodulated current I3 flows at the output terminals T13 and T14 of the code demodulation circuit 33A in the negative direction, i.e., in a direction of the dotted arrows C2. These operations are described below. In this case, all code values of the demodulation codes d1 and d2 are "0", and all the switch elements S11 to S14 are turned off.

At first, described is operation of the code demodulation circuit 33A for a case in which the generated current I1 flows at the input terminals T1 and T2 of the code modulation circuit 23A in the negative direction, and the modulated current I2 flows at the input terminals T11 and T12 of the code demodulation circuit 33A in the negative direction, i.e., in the direction of dotted arrows C2. In this case, the code value of the code sequence c1$a$ is "1", and the code value of the code sequence c1$b$ is "0". Accordingly, the switch elements S32 and S33 receiving the code value "1" of the demodulation code d3 are turned on, and the switch elements S31 and S34 receiving the code value "0" of the demodulation code d4 are turned off. Therefore, the demodulated current I3 flows at the output terminals T13 and T14 in the negative direction, i.e., in the direction of the dotted arrows C2.

Next, operation of the code demodulation circuit 33A is described for a case in which the generated current I1 flows at the input terminals T1 and T2 of the code modulation circuit 23A in the negative direction, and the modulated current I2 flows at the input terminals T11 and T12 of the code demodulation circuit 33A in the positive direction, i.e., in the direction of the solid arrows C1. In this case, the code value of the code sequence c1$a$ is "0", and the code value of the code sequence c1$b$ is "1". Accordingly, the switch elements S32 and S33 receiving the code value "0" of the demodulation code d3 are turned off, and the switch elements S31 and S34 receiving the code value "1" of the demodulation code d4 are turned on. Therefore, the demodulated current I3 flows at the output terminals T13 and T14 in the negative direction, i.e., in the direction of the dotted arrows C2. Accordingly, when the current of negative period of the alternating-current generated current I1 is inputted to the code modulation circuit 23A, the code demodulation circuit 33A can output the demodulated current I3 which is correctly demodulated with negative polarity, to the load 5, as shown in FIG. 9($c$).

As described above, when using the modulation codes m1 to m4 and the demodulation codes d1 to d4 of FIG. 12A, equivalently, the code modulator 2A operates according to the modulation code m0 of Mathematical Expression (6), and the code demodulator 4A operates according to the demodulation code d0 of Mathematical Expression (7).

As described above, according to FIGS. 10, 11, and 12A, when the alternating-current generated current I1 is inputted to the code modulator 2A, it is possible to extract the demodulated current I3 from the code demodulator 4A, the demodulated current I3 being also an alternating current similarly to the generated current I1 inputted to the code modulator 2A. Therefore, according to the second embodiment, it is possible to modulate the alternating-current generated current I1 by code modulation into the alternating-current modulated current I2, and then, transmit the modulated current I2 via the transmission path 3, and then, demodulate the modulated current I2 into the alternating-current demodulated current I3.

Figure 12B:
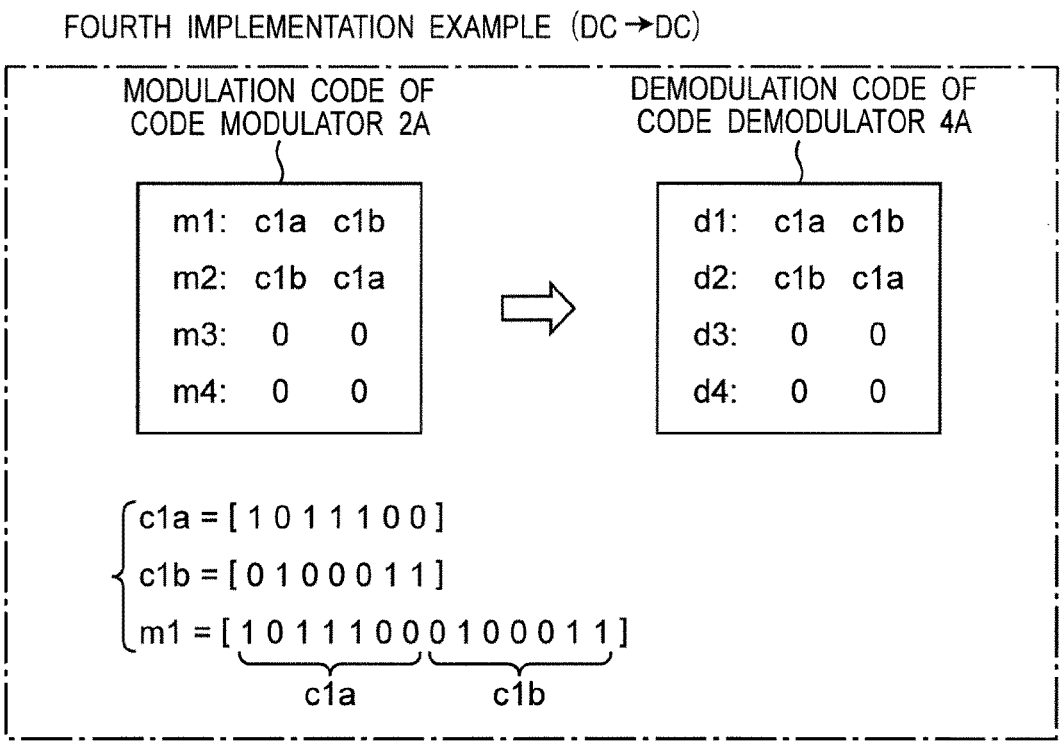
FIG. 12B is a diagram showing an example of a modulation code of the code modulator 2A and a demodulation code of the code demodulator 4A in the power transmission system according to the second embodiment, as a fourth implementation example in which direct-current power is transmitted and received.

FIG. 12B is a diagram showing an example of a modulation code of the code modulator 2A and a demodulation code of the code demodulator 4A in the power transmission system according to the second embodiment, as a fourth implementation example in which direct-current power is transmitted and received. In this case, in the code modulation circuit 23A of FIG. 10 and the code demodulation circuit 33A of FIG. 11, all code values of the modulation codes m3 and m4 and the demodulation codes d3 and d4 are set to "0" as shown in FIG. 12B, and thus, the switch elements S21 to S24 and S31 to S34 are turned off. Thus, the code modulation circuit 23A of FIG. 10 and the code demodulation circuit 33A of FIG. 11 operate as the code modulation circuit 23 and the code demodulation circuit 33 of FIG. 7, respectively. Accordingly, it is possible to achieve direct-current power transmission of FIG. 4 by generating the modulation codes m1 and m2 and the demodulation codes d1 and d2 from the code sequences c1$a$ and c1$b$ as shown in FIG. 12B. Thus, by changing the modulation codes m1 to m4 and the demodulation codes d1 to d4, it is possible to achieve a favorable power transmission system capable of supporting both direct-current power transmission and alternating-current power transmission using the code modulation circuit 23A of FIG. 10 and the code demodulation circuit 33A of FIG. 11.

The direct-current power generator 1 may be, for example, a photovoltaic power generator. The alternating-current power generator 1 may be, for example, a power generator provided with a turbine rotated by thermal power, hydraulic power, wind power, nuclear power, tidal power, or the like.

As described above, by using the modulation code and the demodulation code identical to each other, the power transmission system according to the second embodiment is capable of modulating and transmitting the direct-current generated current I1 and demodulating the modulated current into the direct-current demodulated current I3, and is also capable of modulating and transmitting the alternating-current generated current I1 and demodulating the modulated current into the alternating-current demodulated current I3. In addition, by using the demodulation code different from the modulation code, the power transmission system according to the second embodiment is capable of modulating and transmitting the direct-current generated current I1 and demodulating the modulated current into the alternating-current demodulated current I3, and is also capable of modulating and transmitting the alternating-current generated current I1 and demodulating the modulated current into the direct-current demodulated current I3.

Since the code modulation circuit 23A of FIG. 10 and the code demodulation circuit 33A of FIG. 11 are provided with the bidirectional switch circuits SS21 to SS24 and SS31 to SS34, these circuits are reversible. More specifically, the code modulation circuit 23A is also operable as a code demodulation circuit to demodulate a modulated current inputted from the terminals T3 and T4 and output the demodulated current from the terminals T1 and T2. The code demodulation circuit 33A is also operable as a code modulation circuit to modulate a generated current inputted from the terminals T13 and T14 and output the modulated current from the terminals T11 and T12. Thus, as described in a sixth embodiment, it is possible to transmit power from the code demodulator provided with the code demodulation circuit 33A, to the code modulator provided with the code modulation circuit 23A.

FIGS. 10 to 11 show the example in which each of the bidirectional switch circuits SS21 to SS34 is made of a pair of switch elements connected in parallel such that currents flow in opposite directions (S1, S21; S2, S22; S3, S23; S4, S24; S11, S31; S12, S32; S13, S33; S14, S34). Alternatively, each of the bidirectional switch circuits SS21 to SS34 may be made of a pair of switch elements connected in series, as shown in FIGS. 13A to 14D (S41, S51; S42, S52; S43, S53; S44, S54). In each of FIGS. 13A to 14D, the direction from top to bottom is referred to as a "positive direction", and the direction from bottom to top is referred to as a "negative direction".

Figure 13A:
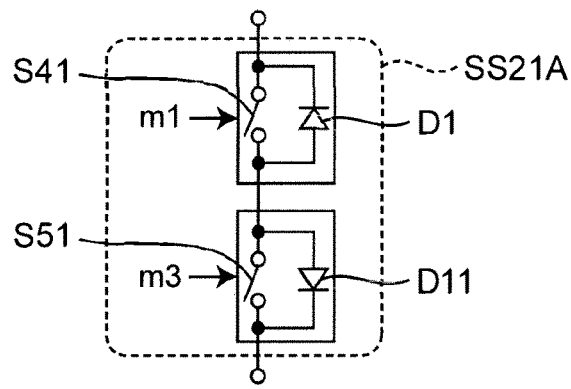
FIG. 13A is a circuit diagram showing a configuration of a bidirectional switch circuit SS21A for a code modulation circuit 23A used in a power transmission system according to a modified embodiment of the second embodiment.

FIG. 13A is a circuit diagram showing a configuration of a bidirectional switch circuit SS21A for a code modulation circuit 23A used in a power transmission system according to a modified embodiment of the second embodiment. The switch circuit SS21A of FIG. 13A corresponds to the switch circuit SS21 of FIG. 10, and is made of series connection of: (1) a switch element S41 connected in parallel with a diode D1 allowing a current to flow in the negative direction, and turned on and off in accordance with the modulation code m1; and (2) a switch element S51 connected in parallel with a diode D11 allowing a current to flow in the positive direction, and turned on and off in accordance with the modulation code m3.

Figure 13B:
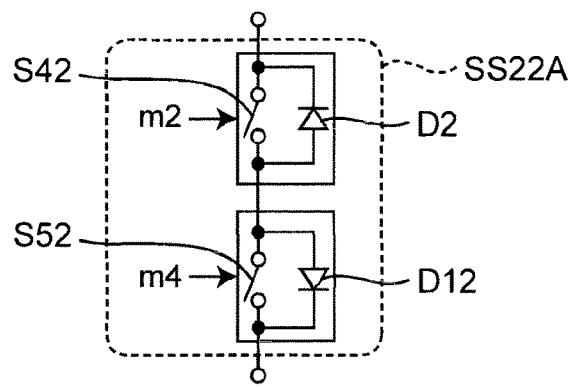
FIG. 13B is a circuit diagram showing a configuration of a bidirectional switch circuit SS22A for the code modulation circuit 23A used in the power transmission system according to the modified embodiment of the second embodiment.

FIG. 13B is a circuit diagram showing a configuration of a bidirectional switch circuit SS22A for the code modulation circuit 23A used in the power transmission system according to the modified embodiment of the second embodiment. The switch circuit SS22A of FIG. 13B corresponds to the switch circuit SS22 of FIG. 10, and is made of series connection of: (1) a switch element S42 connected in parallel with a diode D2 allowing a current to flow in the negative direction, and turned on and off in accordance with the modulation code m2; and (2) a switch element S52 connected in parallel with a diode D12 allowing a current to flow in the positive direction, and turned on and off in accordance with the modulation code m4.

Figure 13C:
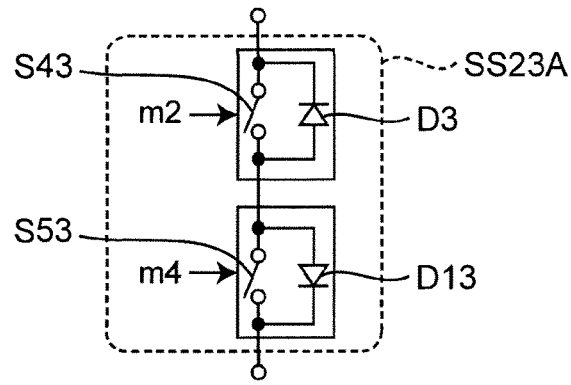
FIG. 13C is a circuit diagram showing a configuration of a bidirectional switch circuit SS23A for the code modulation circuit 23A used in the power transmission system according to the modified embodiment of the second embodiment.

FIG. 13C is a circuit diagram showing a configuration of a bidirectional switch circuit SS23A for the code modulation circuit 23A used in the power transmission system according to the modified embodiment of the second embodiment. The switch circuit SS23A of FIG. 13C corresponds to the switch circuit SS23 of FIG. 10, and is made of series connection of: (1) a switch element S43 connected in parallel with a diode D3 allowing a current to flow in the negative direction, and turned on and off in accordance with the modulation code m2; and (2) a switch element S53 connected in parallel with a diode D13 allowing a current to flow in the positive direction, and turned on and off in accordance with the modulation code m4.

Figure 13D:
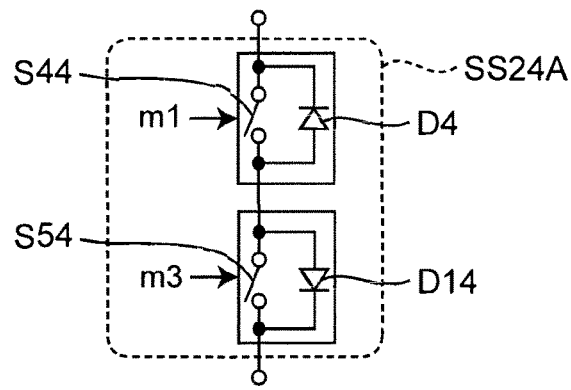
FIG. 13D is a circuit diagram showing a configuration of a bidirectional switch circuit SS24A for the code modulation circuit 23A used in the power transmission system according to the modified embodiment of the second embodiment.

FIG. 13D is a circuit diagram showing a configuration of a bidirectional switch circuit SS24A for the code modulation circuit 23A used in the power transmission system according to the modified embodiment of the second embodiment. The switch circuit SS24A of FIG. 13D corresponds to the switch circuit SS24 of FIG. 10, and is made of series connection of: (1) a switch element S44 connected in parallel with a diode D4 allowing a current to flow in the negative direction, and turned on and off in accordance with the modulation code m1; and (2) a switch element S54 connected in parallel with a diode D14 allowing a current to flow in the positive direction, and turned on and off in accordance with the modulation code m3.

Figure 14A:
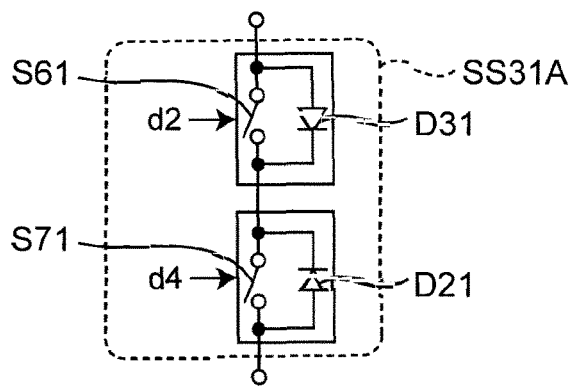
FIG. 14A is a circuit diagram showing a configuration of a bidirectional switch circuit SS31A for a code demodulation circuit 33A used in the power transmission system according to the modified embodiment of the second embodiment.

FIG. 14A is a circuit diagram showing a configuration of a bidirectional switch circuit SS31A for a code demodulation circuit 33A used in the power transmission system according to the modified embodiment of the second embodiment. The switch circuit SS31A of FIG. 14A corresponds to the switch circuit SS31 of FIG. 11, and is made of series connection of: (1) a switch element S61 connected in parallel with a diode D31 allowing a current to flow in the positive direction, and turned on and off in accordance with the demodulation code d2; and (2) a switch element S71 connected in parallel with a diode D21 allowing a current to flow in the negative direction, and turned on and off in accordance with the demodulation code d4.

Figure 14B:
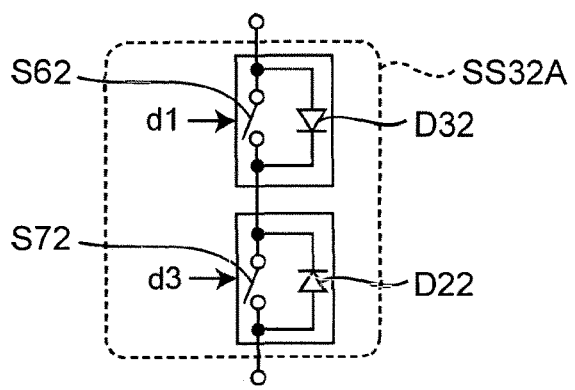
FIG. 14B is a circuit diagram showing a configuration of a bidirectional switch circuit SS32A for the code demodulation circuit 33A used in the power transmission system according to the modified embodiment of the second embodiment.

FIG. 14B is a circuit diagram showing a configuration of a bidirectional switch circuit SS32A for the code demodulation circuit 33A used in the power transmission system according to the modified embodiment of the second embodiment. The switch circuit SS32A of FIG. 14B corresponds to the switch circuit SS32 of FIG. 11, and is made of series connection of: (1) a switch element S62 connected in parallel with a diode D32 allowing a current to flow in the positive direction, and turned on and off in accordance with the demodulation code d1; and (2) a switch element S72 connected in parallel with a diode D22 allowing a current to flow in the negative direction, and turned on and off in accordance with the demodulation code d3.

Figure 14C:
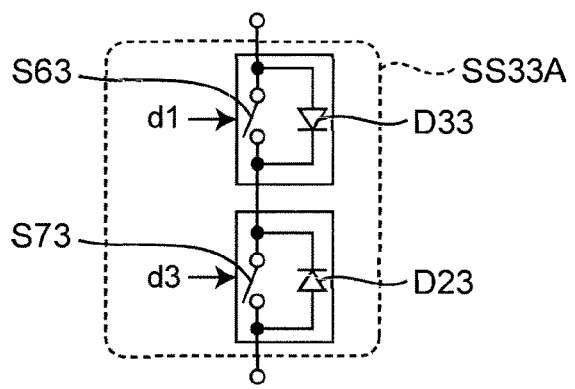
FIG. 14C is a circuit diagram showing a configuration of a bidirectional switch circuit SS33A for the code demodulation circuit 33A used in the power transmission system according to the modified embodiment of the second embodiment.

FIG. 14C is a circuit diagram showing a configuration of a bidirectional switch circuit SS33A for the code demodulation circuit 33A used in the power transmission system according to the modified embodiment of the second embodiment. The switch circuit SS33A of FIG. 14C corresponds to the switch circuit SS33 of FIG. 11, and is made of series connection of: (1) a switch element S63 connected in parallel with a diode D33 allowing a current to flow in the positive direction, and turned on and off in accordance with the demodulation code d1; and (2) a switch element S73 connected in parallel with a diode D23 allowing a current to flow in the negative direction, and turned on and off in accordance with the demodulation code d3.

Figure 14D:
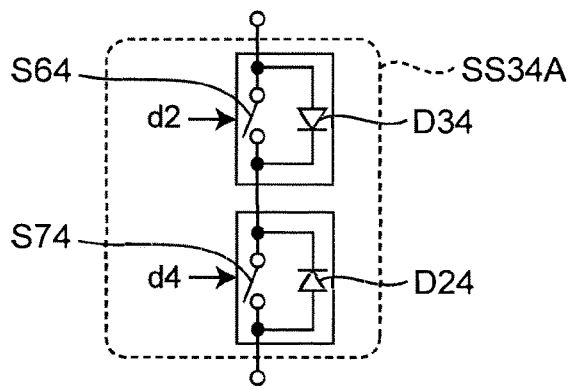
FIG. 14D is a circuit diagram showing a configuration of a bidirectional switch circuit SS34A for the code demodulation circuit 33A used in the power transmission system according to the modified embodiment of the second embodiment.

FIG. 14D is a circuit diagram showing a configuration of a bidirectional switch circuit SS34A for the code demodulation circuit 33A used in the power transmission system according to the modified embodiment of the second embodiment. The switch circuit SS34A of FIG. 14D corresponds to the switch circuit SS34 of FIG. 11, and is made of series connection of: (1) a switch element S64 connected in parallel with a diode D34 allowing a current to flow in the positive direction, and turned on and off in accordance with the demodulation code d2; and (2) a switch element S74 connected in parallel with a diode D24 allowing a current to flow in the negative direction, and turned on and off in accordance with the demodulation code d4.

Referring to FIG. 13A to FIG. 14D, each of the switch elements S41 to S74 may be made of, for example, an MOS transistor. Parallel parasitic (body) diodes D1 to D34 of MOS transistors may be used. For example, when each of the switch circuits SS21A to SS34A of FIGS. 13A to 14D is implemented by a switch element of an MOS transistor and one diode, two MOS transistors and two diodes are required for each one of the bidirectional switch circuit SS21A to SS34A. Meanwhile, packaged MOS transistors are widely available, including a built-in diode having good reverse characteristics. When using such packaged MOS transistors, each of the bidirectional switch circuits SS21A to SS34A can be made of two switch elements, and thus, size can be reduced.

Third Embodiment

In the first and second embodiments, we have described the power transmission systems which transmit power from the one power generator 1 to the one load 5. Meanwhile, in a third embodiment, we describe a power transmission system which transmits powers from a plurality of power generators to a plurality of loads.

Figure 15:
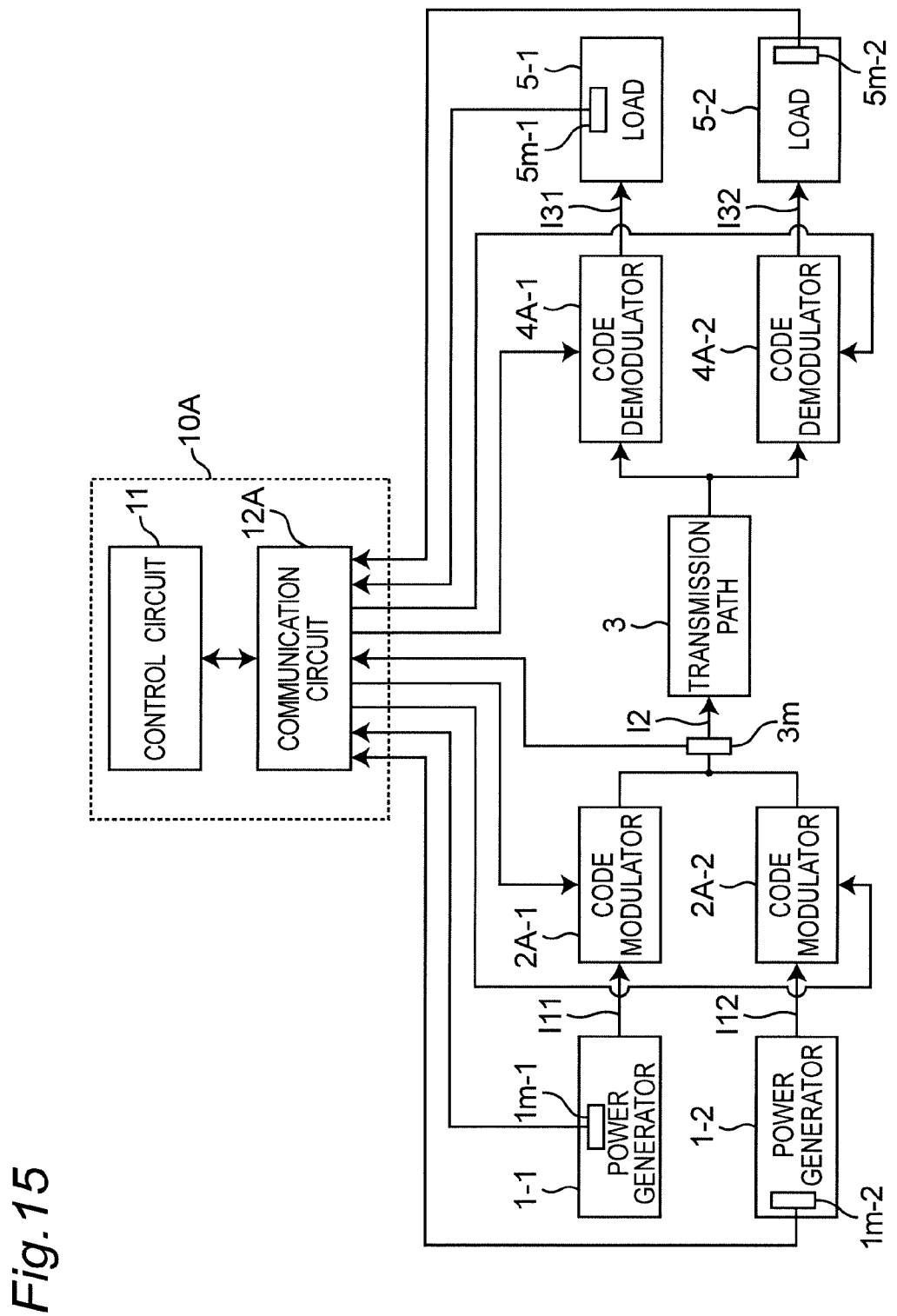
FIG. 15 is a block diagram showing a configuration of a power transmission system according to a third embodiment.

FIG. 15 is a block diagram showing a configuration of a power transmission system according to the third embodiment. Referring to FIG. 15, the power transmission system according to the third embodiment is provided with a plurality of power generators 1-1 and 1-2, a plurality of code modulators 2A-1 and 2A-2, a transmission path 3, a plurality of code demodulators 4A-1 and 4A-2, a plurality of loads 5-1 and 5-2, and a controller 10A.

The controller 10A is provided with a control circuit 11 and a communication circuit 12A. The control circuit 11 communicates with the code modulators 2A-1 and 2A-2 and the code demodulators 4A-1 and 4A-2 via the communication circuit 12A, and controls operations of the code modulators 2A-1 and 2A-2 and the code demodulators 4A-1 and 4A-2.

In the power transmission system of FIG. 15, each of the code modulators 2A-1 and 2A-2 operates as a power transmitter apparatus, and each of the code demodulators 4A-1 and 4A-2 operates as a power receiver apparatus. Each of a plurality of power transmitter apparatuses included in the code modulators 2A-1 and 2A-2 modulates first power to generate a code-modulated wave by code modulation using a modulation code based on a code sequence, and transmits the code-modulated wave to one of the code demodulators 4A-1 and 4A-2 via the transmission path 3. Each one of the code demodulators 4A-1 and 4A-2 receives the code-modulated wave from one of the code modulators 2A-1 and 2A-2 via the transmission path 3, and demodulates the received code-modulated wave to generate second power by code demodulation using a demodulation code based on a code sequence identical to the code sequence of the modulation code used for the code modulation. The first powers are, for example, powers generated by the power generators 1-1 and 1-2, and are shown as generated currents I11 and I12 in FIG. 15. The code-modulated wave is alternating-current power modulated by code modulation, and is shown as a modulated current I2 in FIG. 15. The second power are, for example, powers to be supplied to the loads 5-1 and 5-2, and are shown as demodulated currents I31 and I32 in FIG. 15.

In this case, the code modulators 2A-1 and 2A-2 and the code demodulators 4A-1 and 4A-2 of FIG. 15 are configured and operated similarly to the code modulator 2A and the code demodulator 4A according to the second embodiment.

The power transmission system of FIG. 15 is further provided with power meters 1$m$-1, 1$m$-2, 5$m$-1, and 5 $m$-2. Each of the power meters 1$m$-1 and 1$m$-2 is first power measuring means which measures an amount of the first power. More specifically, each of the power meters 1$m$-1 and 1$m$-2 measures an amount of power generated by the power generators 1-1 and 1-2 and transmitted from the power generators 1-1 and 1-2 to the code modulators 2A-1 and 2A-2. Each of the power meters 5$m$-1 and 5$m$-2 is second power measuring means which measures an amount of the second power. More specifically, each of the power meters 5$m$-1 and 5$m$-2 measures an amount of power transmitted from the code demodulators 4A-1 and 4A-2 to the loads 5-1 and 5-2, and used by the loads 5-1 and 5-2. The amounts of powers measured by the power meters 1$m$-1, 1$m$-2, 5$m$-1, and 5$m$-2 are transmitted to the controller 10A.

The power transmission system of FIG. 15 may be further provided with a current meter 3$m$. The current meter 3$m$ is current measuring means for measuring an amount of current of a code-modulated wave (e.g., modulated current I2) transmitted in the transmission path 3. The amount of current of the code-modulated wave measured by the current meter 3$m$ is transmitted to the controller 10A.

The controller 10A controls operations of the code modulators 2A-1 and 2A-2 and the code demodulators 4A-1 and 4A-2 based on the amounts of powers received from the power meters 1$m$-1, 1$m$-2, 5$m$-1, and 5$m$-2. For example, the controller 10A transmits control signals to the code modulators 2A-1 and 2A-2 and the code demodulators 4A-1 and 4A-2, the control signals including synchronization signals for synchronizing the code modulators 2A-1 and 2A-2 and the code demodulators 4A-1 and 4A-2 to each other, thus achieving code modulation and code demodulation of power in an accurately synchronized manner.

The controller 10A transmits the code sequences of the modulation codes, or information specifying the code sequences, to at least one of the code modulators 2A-1 and 2A-2, which is to transmit power, and transmits the code sequences of the demodulation codes, or information specifying the code sequences, to at least one of the code demodulators 4A-1 and 4A-2, which is to receive power. For example, when transmitting power from the code modulator 2A-1 to the code demodulator 4A-1, the controller 10A sets a modulation code to the code modulator 2A-1, and a demodulation code to the code demodulator 4A-1, based on one code sequence. When simultaneously transmitting power from the code modulator 2A-2 to the code demodulator 4A-2, the controller 10A sets a modulation code to the code modulator 2A-2, and a demodulation code to the code demodulator 4A-2, based on another different code sequence. When simultaneously transmitting powers from the plurality of code modulators 2A-1 and 2A-2 to the plurality of code demodulators 4A-1 and 4A-2, a plurality of orthogonal code sequences may be used.

Thus, it is possible to transmit powers from the plurality of power generators 1-1 and 1-2 to the plurality of loads 5-1 and 5-2.

Now, we describe exemplary operations of the code modulators 2A-1 and 2A-2 and the code demodulators 4A-1 and 4A-2 for transmitting powers generated by the power generators 1-1 and 1-2 to the loads 5-1 and 5-2.

In the third embodiment, we describe a case in which the power generators 1-1 and 1-2 output direct-current powers, direct-current power is inputted to the load 5-1, and alternating-current power is inputted to the load 5-2. That is, when transmitting power from the power generator 1-2 to the load 5-2, direct-current power is converted into alternating-current power.

Figure 16A:
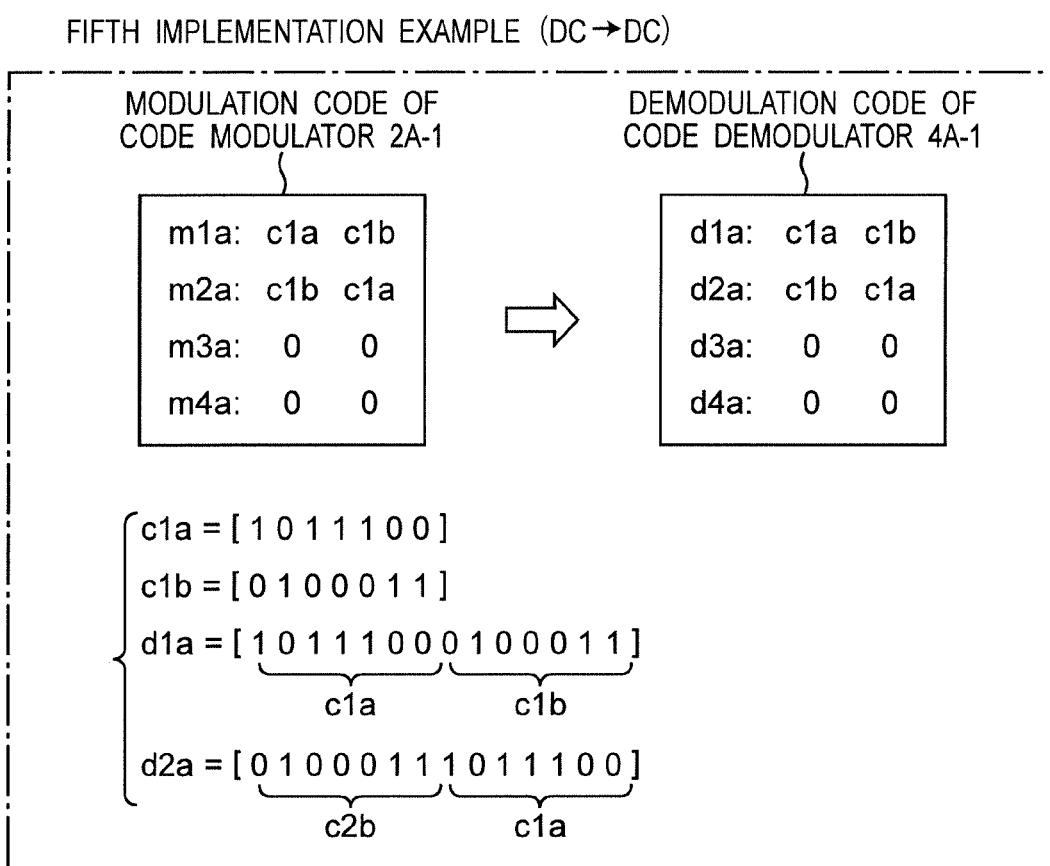
FIG. 16A is a diagram showing an example of a modulation code of a code modulator 2A-1 and a demodulation code of a code demodulator 4A-1 in the power transmission system of FIG. 15 according to the third embodiment, in which direct-current power is transmitted and received.

FIG. 16A is a diagram showing an example of a modulation code of the code modulator 2A-1 and a demodulation code of the code demodulator 4A-1 in the power transmission system of FIG. 15 according to the third embodiment, in which direct-current power is transmitted and received. In addition, FIG. 16B is a diagram showing an example of a modulation code of the code modulator 2A-2 and a demodulation code of the code demodulator 4A-2 in the power transmission system of FIG. 15 according to the third embodiment, in which direct-current power is transmitted and alternating-current power is received.

FIG. 16A shows modulation codes and demodulation codes inputted to the switch elements S1 to S44 of the code modulator 2A-1 and the code demodulator 4A-1. In this case, modulation codes m1$a$ to m4$a$ correspond to the modulation codes m1 to m4 of the code modulation circuit 23A as shown in FIG. 10, respectively, and demodulation codes d1$a$ to d4$a$ correspond to the demodulation codes d1 to d4 of the code demodulation circuit 33A as shown in FIG. 11, respectively. In this case, as described with reference to FIG. 12B, by setting all the code values of the modulation codes m3$a$ and m4$a$ and the demodulation codes d3$a$ and d4$a$ to "0", the switch elements S21 to S24 and S31 to S34 are turned off. In addition, the modulation codes m1$a$ and m2$a$ and the demodulation codes d1$a$ and d2$a$ are generated from the code sequence c1$a$ and the code sequence c1$b$, as described with reference to FIG. 12B.

Figure 16B:
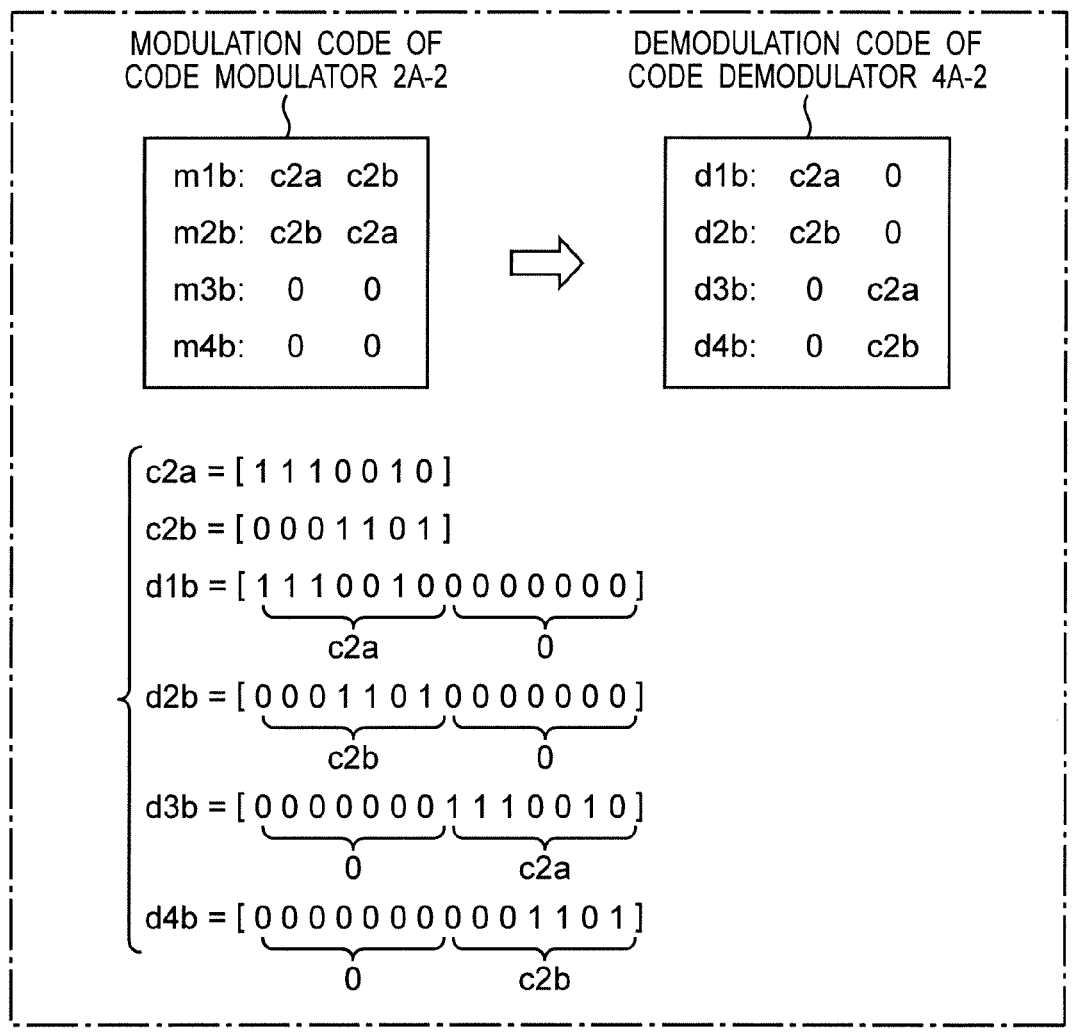
FIG. 16B is a diagram showing an example of a modulation code of the code modulator 2A-2 and a demodulation code of the code demodulator 4A-2 in the power transmission system of FIG. 15 according to the third embodiment, in which direct-current power is transmitted and alternating-current power is received.

Further, FIG. 16B shows modulation codes and demodulation codes inputted to the switch elements S1 to S44 of the code modulator 2A-2 and the code demodulator 4A-2. In this case, modulation codes m1$b$ to m4$b$ correspond to the modulation codes m1 to m4 of the code modulation circuit 23A as shown in FIG. 10, respectively, and demodulation codes d1b to d4b correspond to the demodulation codes d1 to d4 of the code demodulation circuit 33A as shown in FIG. 11, respectively. In this case, by setting all the code values of the modulation codes m3b and m4b to "0", the switch elements S21 to S24 are turned off. In addition, the modulation codes m1b and m2b and the demodulation codes d1b to d4b are generated from the code sequence c2a and the code sequence c2b. The principle of code modulation and code demodulation of currents is similar to that of the first and second embodiments, and therefore, its explanation is omitted here.

Figure 17:
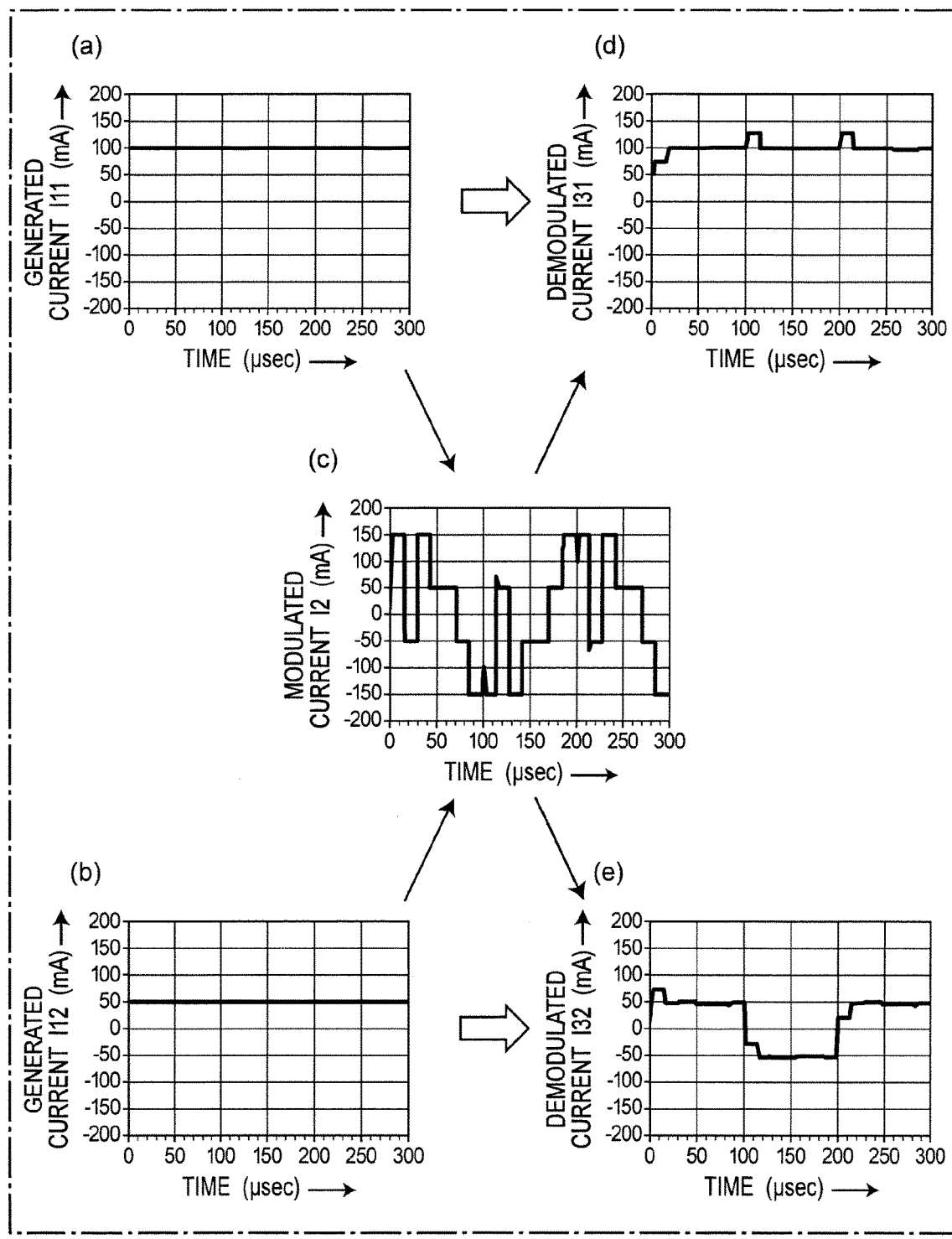
FIG. 17 is a waveform diagram showing exemplary signal waveforms in the power transmission system according to the third embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Now, with reference to FIG. 17, we describe an operation of transmitting powers from the plurality of power generators 1-1 and 1-2 to the plurality of loads 5-1 and 5-2.

FIG. 17 are waveform diagrams, where (a) to (e) show exemplary signal waveforms of the power transmission system according to the third embodiment. In FIG. 17, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32.

The code modulator 2A-1 modulates the direct-current generated current I11 by code modulation into an alternating-current code-modulated wave. Similarly, the code modulator 2A-2 modulates the direct-current generated current I12 by code modulation into an alternating-current code-modulated wave. As shown in FIG. 17(c), the code-modulated wave generated by the code modulator 2A-1 and the code-modulated wave generated by the code modulator 2A-2 are transmitted as the combined modulated current I2 via the transmission path 3.

As described above, the code modulators 2A-1 and 2A-2 have an identical configuration, and are configured in a manner similar to that of the code modulator 2A of FIG. 10. In addition, the code demodulators 4A-1 and 4A-2 also have an identical configuration, and are configured in a manner similar to that of the code demodulator 4A of FIG. 11. The difference between the code modulators 2A-1 and 2A-2, and the difference between the code demodulators 4A-1 and 4A-2 reside in the use of different sets of the code sequences c1a and c1b, and the code sequences c2a and c2b. The code modulator 2A-1 and the code demodulator 4A-1 use the code sequences c1a and c1b, and the code modulator 2A-2 and the code demodulator 4A-2 use the code sequences c2a and c2b. In this case, the code sequences c1a and c2a are orthogonal to each other, and therefore, the code sequences c1b and c2b are also orthogonal to each other. In this case, Gold sequences of seven stages are adopted, and different Gold sequences are set to the code sequences c1a and c2a.

The code demodulators 4A-1 and 4A-2 can demodulate the modulated current I2 to extract powers generated by the corresponding code modulators 2A-1 and 2A-2, respectively, by using the orthogonal code sequences c1a and c2a. Accordingly, as shown in FIGS. 17(d) and (e), the generated currents I11 and I12 are inputted to the code modulators 2A-1 and 2A-2, and then, the currents are transmitted as code-modulated waves, and then, the corresponding code demodulators 4A-1 and 4A-2 correctly demodulate and output the demodulated currents I31 and I32. As a result, the demodulated currents I31 and I32 having desired waveforms (direct current or alternating current) and desired magnitudes are supplied to the loads 5-1 and 5-2, respectively.

As described above, according to the present embodiment, it is possible to simultaneously perform two power transmissions in a multiplexed manner in the one transmission path 3, and separate the transmitted powers from each other, by using the code modulators 2A-1 and 2A-2 and the code demodulators 4A-1 and 4A-2. Accordingly, it is possible to achieve a favorable power transmission system capable of simultaneously transmitting currents of desired magnitudes from the two power generators 1-1 and 1-2 to the two loads 5-1 and 5-2

By measuring instantaneous powers at the code modulators 2A-1 and 2A-2 or the code demodulators 4A-1 and 4A-2 and comparing the instantaneous powers with the code sequences, it is possible to know which of the power generators 1-1 and 1-2 transmits power, which of the loads receives power, and what amount of power is transmitted. Accordingly, when a plurality of the different power generators 1-1 and 1-2 requiring different generation costs are connected, it is possible to conduct power business with electricity charges dependent on which of the power generators 1-1 and 1-2 transmits power. Alternatively, in case of a system having variable power transmission efficiency depending on which of the power generators 1-1 and 1-2 transmits power and which of the loads 5-1 and 5-2 receives the power, it is possible to achieve optimum power supply by managing and analyzing information on power transmission.

As described above, according to the present embodiment, it is possible to provide the power transmission system capable of efficiently supplying power from the one or more power generators 1-1 and 1-2 to the one or more loads 5-1 and 5-2, by using the code modulators 2A-1 and 2A-2 and the code demodulators 4A-1 and 4A-2.

In the above described embodiment, we indicated the example of the power transmission system including the two power generators 1-1 and 1-2 and the two loads 5-1 and 5-2, but the present disclosure is not limited thereto. It is possible to provide power transmission systems including the one power generator 1-2 and the two or more loads 5-1 and 5-2, or including two or more power generators 1-1 and 1-2 and the two or more loads 5-1 and 5-2. In this case, it is possible to simultaneously perform a number of power transmissions using one transmission path 3. Accordingly, it is possible to reduce costs for installation of the transmission path 3, and reduce costs by reducing the number of transmission paths 3, etc.

In the above described embodiment, we indicated the example in which each of the code modulators 2A-1 and 2A-2 of FIG. 15 is configured as the code modulation circuit 23A of FIG. 10, but the present disclosure is not limited thereto. For example, when the output powers from the power generators 1-1 and 1-2 are direct-current powers, each of the code modulators 2A-1 and 2A-2 may be configured as the code modulation circuit 23 of FIG. 7. In addition, when the input powers to the loads 5-1 and 5-2 are direct-current powers, each of the code demodulators 4A-1 and 4A-2 may be configured as the code demodulation circuit 33 of FIG. 7. In these cases, it is possible to simplify the circuit configurations of the code modulators 2A-1 and 2A-2 and the code demodulators 4A-1 and 4A-2, and accordingly, there are advantageous effects of reducing the number of parts, reducing costs, and reducing size of the apparatuses.

In the third embodiment, we indicated the example of the power transmission system which transmits powers from two power generators each having direct-current output power, to one load having direct-current input power, and to one load having alternating-current input power, but the present disclosure is not limited thereto. The power transmission system may receive powers from any number of power generators each having direct-current output power, and from any number of power generators each having alternating-current output power. In addition, the power transmission system may supply powers to any number of loads each having direct-current input power, and to any number of loads each having alternating-current input power.

Photovoltaic power generation, which generates most of natural energy, generates direct-current power. On the other hand, wind power generation and geothermal power generation generate alternating-current power. In this case, since it is not desirable that both direct-current power supplies and alternating-current power supplies are connected to the same power network, according to conventional power transmission systems, all power generators (power supplies) and loads should be of only direct current or only alternating current.

On the other hand, according to the power transmission system according to the present embodiment, by using code modulation and code demodulation, it is possible simultaneously transmit powers from a direct-current power supply to a direct-current load, from a direct-current power supply to an alternating-current load, from an alternating-current power supply to a direct-current load, and from an alternating-current power supply to an alternating-current load, via one transmission path.

Thus, according to the first to third embodiments, it is possible to provide a favorable power transmission system capable of correctly perform code modulation and code demodulation of power, and further, capable of simultaneously performing a plurality of power transmissions in a multiplexed manner via one transmission path.

Fourth Embodiment

In the present embodiment, a power transmission system which transmits powers from a plurality of power supplies to a plurality of loads is provided, the power transmission system capable of distinguishing and separating transmitted powers from each other, and reducing a total amount of current flowing in a transmission path 3.

A power transmission system according to a fourth embodiment is configured in a manner similar to that of the power transmission system of FIG. 15. In the present embodiment, we describe a case in which power is transmitted from a code modulator 2A-1 to a code demodulator 4A-1, and simultaneously, power is transmitted from a code modulator 2A-2 to a code demodulator 4A-2. Hereinafter, a pair of a code modulator and a code demodulator between which power is transmitted is referred to as a "transmitter and receiver pair". Code-modulated waves of a plurality of transmitter and receiver pairs are superposed in the transmission path 3, and their combined wave flows as a modulated current I2.

Figure 18:
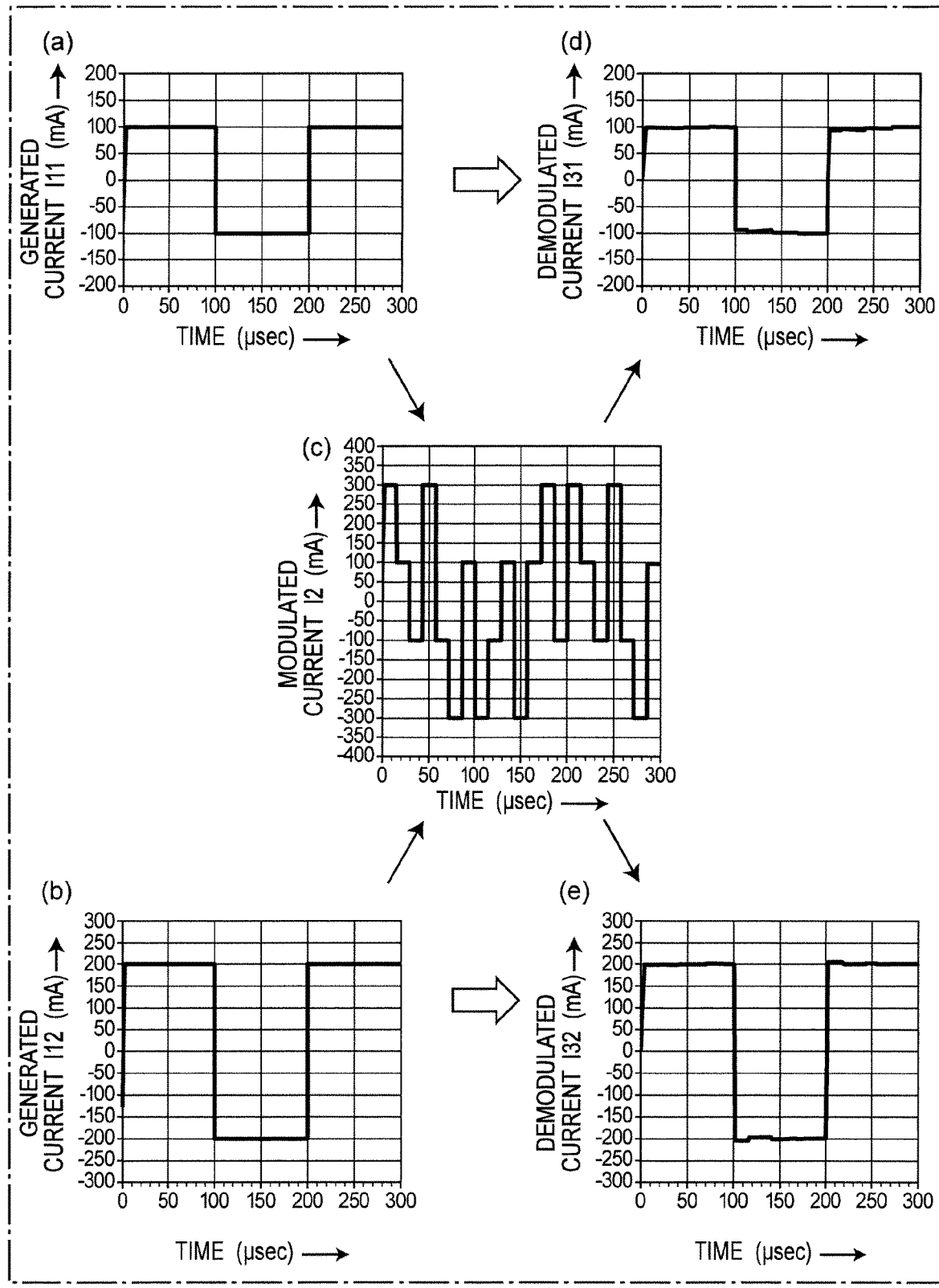
FIG. 18 is a waveform diagram showing exemplary signal waveforms in a power transmission system according to a fourth embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

FIG. 18 are waveform diagrams, where (a) to (e) show exemplary signal waveforms of the power transmission system according to the fourth embodiment. In FIG. 18, (a) shows a signal waveform of a generated current I11, (b) shows a signal waveform of a generated current I12, (c) shows a signal waveform of the modulated current I2, (d) shows a signal waveform of a demodulated current I31, and (e) shows a signal waveform of a demodulated current I32. More specifically, FIG. 18 shows exemplary signal waveforms generated as follows: the code modulators 2A-1 and 2A-2 modulate the alternating-current generated currents I11 and I12 by code modulation, and then, the modulated current I2 is transmitted via a transmission path 3, and then, the code demodulators 4A-1 and 4A-2 demodulate the modulated current I2 by code demodulation. For example, each of the alternating-current generated currents I11 and I12 has a rectangular waveform at a frequency of 5 kHz, which cyclically repeats positive and negative periods every 200 microseconds.

For example, a modulation code m11 of the code modulator 2A-1 and a modulation code m12 of the code modulator 2A-2 of FIG. 18 are given as follows.

$$m11=[1\ -1\ 1\ 1\ 1\ -1\ -1\ -1\ 1\ -1\ -1\ -1\ 1\ 1] \quad (9)$$

$$m12=[1\ 1\ -1\ 1\ -1\ -1\ 1\ -1\ 1\ -1\ 1\ 1\ -1] \quad (10)$$

When using the modulation codes m1 to m4 of FIG. 12A, equivalently, the code modulator 2A-1 operates according to the modulation code m11 of Mathematical Expression (9), and the code modulator 2A-2 operates according to the modulation code m12 of Mathematical Expression (10). The same also applies to the following description.

Figure 19:
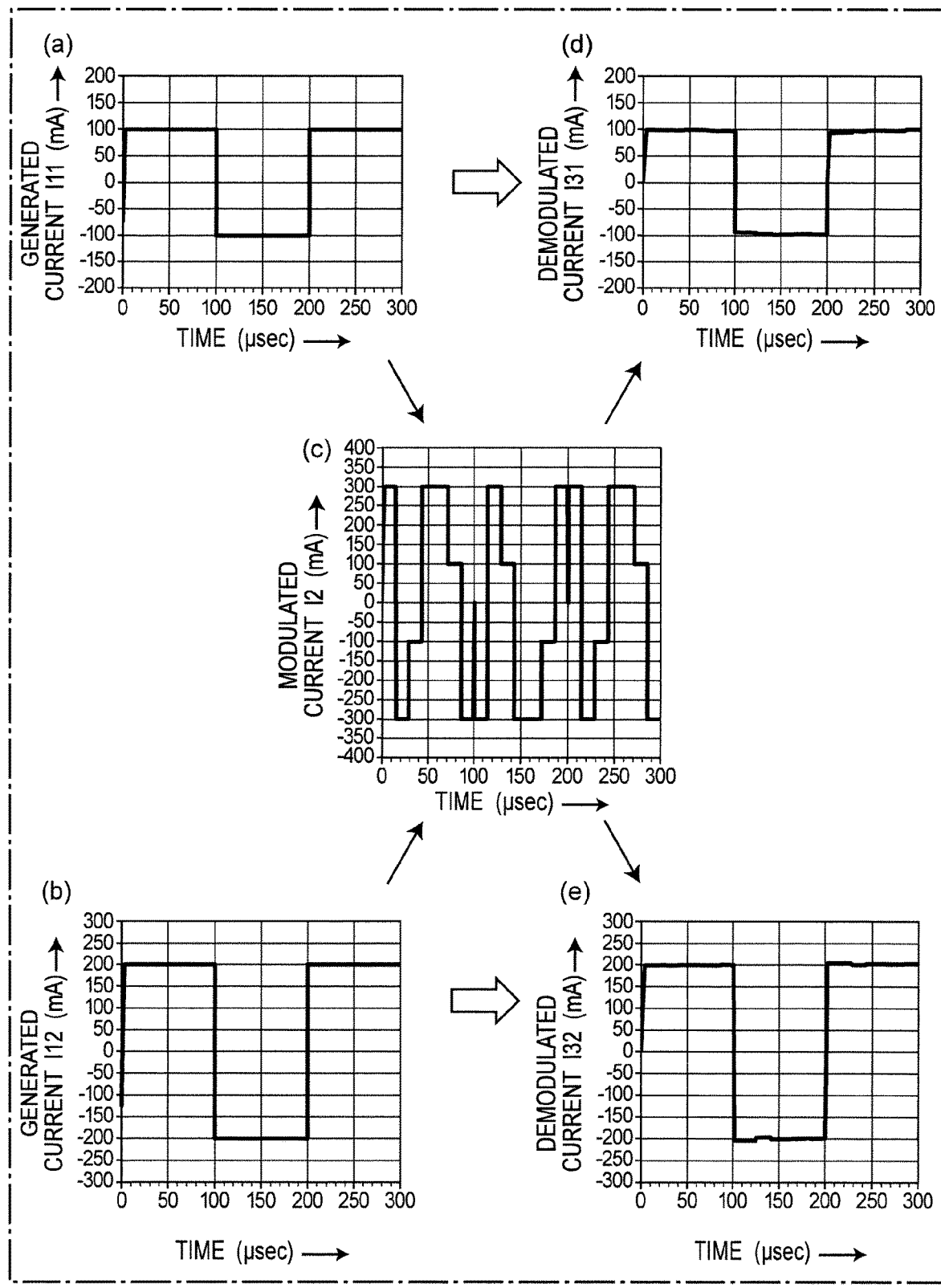
FIG. 19 is a waveform diagram showing exemplary signal waveforms in a power transmission system according to a first comparison example of the fourth embodiment, in which: (a) shows a signal waveform of a generated current I11; (b) shows a signal waveform of a generated current I12; (c) shows a signal waveform of a modulated current I2; (d)

On the other hand, FIG. 19 are waveform diagrams, where (a) to (e) show exemplary signal waveforms of a power transmission system according to a first comparison example of the fourth embodiment. In FIG. 19, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32.

In case of FIG. 19, the modulation code m11 of the code modulator 2A-1 and the modulation code m12 of the code modulator 2A-2 are given as follows.

$$m11=[1\ -1\ 1\ 1\ 1\ -1\ -1\ -1\ 1\ -1\ -1\ -1\ 1\ 1] \quad (11)$$

$$m12=[1\ -1\ -1\ 1\ 1\ 1\ -1\ -1\ 1\ 1\ -1\ -1\ -1\ 1] \quad (12)$$

According to FIGS. 18(d) and (e) and FIGS. 19(d) and (e), it can be seen that even when using either combination of modulation codes, the alternating-current generated currents I11 and I12 are modulated by code modulation to generate the modulated current I2, and then, the modulated current I2 is transmitted via a transmission path 3, and then, the modulated current I2 is demodulated by code demodulation to generate the alternating-current demodulated currents I31 and I32.

However, the magnitude of the modulated current I2 in the transmission path 3 in case of FIG. 18 is different from that in case of FIG. 19 as follows. According to the present embodiment, a current characteristic value indicating the magnitude of the modulated current I2 is defined as follows. The controller 10A calculates a sum of absolute values of the modulated current I2 corresponding to respective bits of the modulation code for a period of one cycle of the modulation code, based on the magnitudes of the generated currents I11 and I12 and values of bits of the modulation codes. The controller 10A uses the calculated sum as the current characteristic value. In case of FIG. 18(c), the current characteristic value is 1300 mA. In case of FIG. 19(c), the current characteristic value is 1700 mA. Thus, it can be seen that even when transmitting the same power, different amounts of the currents flow in the transmission path 3.

Accordingly, the controller 10A selects and assigns a plurality of code sequences to a plurality of transmitter and receiver pairs so as to reduce the current characteristic value as compared to a predetermined reference value. For example, the predetermined reference value may be an upper limit of the current allowed to flow in the transmission path 3, or may be any other value. When the current characteristic value exceeds the reference value for any selected combination of code sequences, for example, the controller 10A may cancel power transmission of one of the transmitter and receiver pairs.

Alternatively, the controller 10A may select and assigns a plurality of code sequences to a plurality of transmitter and receiver pairs so as to minimize the current characteristic value.

When the code sequences have assigned, the code modulators 2A-1 and 2A-2 and the code demodulators 4A-1 and 4A-2 generate modulation codes and demodulation codes, respectively, based on the assigned code sequences.

Note that the current characteristic value substantially corresponds to an average of an absolute value of a total current of the code-modulated waves of the plurality of transmitter and receiver pairs in the transmission path 3, the average being averaged over a predetermined time.

Specifically, the current characteristic value is calculated as follows.

For the purpose of explanation, we consider a case in which there are N power generators, N code modulators, N code demodulators, and N loads, the N power generators generate N generated currents, respectively, and the generated currents are modulated by code modulation using modulation codes each having M-bit cycle. In this case, in each cycle of the modulation code, $A(n, m)$ denotes the m-th bit ($1 \leq m \leq M$) of the n-th generated current ($1 \leq n \leq N$), and $C(n, m)$ denotes the m-th bit of the n-th modulation code used for code modulation of the n-th generated current. In this case, the current characteristic value is calculated as follows.

$$\sum_{m=1}^{M} \left| \sum_{n=1}^{N} A(n, m) \cdot C(n, m) \right| \quad (13)$$

Before starting new power transmission from the plurality of code modulators to the plurality of code demodulators, a plurality of code sequences are selected and assigned to the plurality of transmitter and receiver pairs so as to reduce or minimize the current characteristic value.

Thus, it is possible to reduce or minimize the current characteristic value by selecting an appropriate combination of the code sequences. By reducing the total amount of current flowing in the transmission path 3, it possible to reduce loss in power transmission. In addition, by reducing the total amount of current flowing in the transmission path 3, it is possible to use electric wires and cables having smaller cross-sectional areas, and therefore, reduce costs of the power transmission system.

In addition, when a new transmitter and receiver pair starts power transmission in a state that at least one existing transmitter and receiver pair is transmitting power, one code sequence is selected and assigned to the new transmitter and receiver pair as follows.

When a new transmitter and receiver pair starts power transmission in the state that at least one existing transmitter and receiver pair is transmitting power, the controller 10A calculates a current characteristic value of a total current of the code-modulated wave of the existing transmitter and receiver pair, and the code-modulated wave of the new transmitter and receiver pair, in the transmission path 3.

The controller 10A selects and assigns one code sequence to a new transmitter and receiver pair so as to reduce the current characteristic value as compared to a reference value (e.g., upper limit of current allowed to flow in the transmission path 3). When the current characteristic value exceeds the reference value for any selected code sequence, for example, the controller 10A may cancel power transmission of the new transmitter and receiver pair.

Alternatively, the controller 10A may select and assign one code sequence to the new transmitter and receiver pair so as to minimize the current characteristic value.

Specifically, the current characteristic value is calculated as follows.

We consider a case in which an (N'+1)-th transmitter and receiver pair newly starts power transmission in a state that N' (N'<N) existing transmitter and receiver pairs are transmitting power. A current value for the existing transmitter and receiver pairs, corresponding to the m-th bit of the modulation code is given as follows.

$$B(m) = \sum_{n=1}^{N'} A(n, m) \cdot C(n, m) \quad (14)$$

The current value B (m) for the existing transmitter and receiver pairs has been already calculated. If the calculated current value B (m) is stored by the controller 10A, it is not necessary to repeat calculation. In this case, the current characteristic value of the total current of the code-modulated waves of the existing transmitter and receiver pairs, and the code-modulated wave of the new transmitter and receiver pair, in the transmission path 3 is calculated as follows.

$$\sum_{m=1}^{M} |B(m) + A(N' + 1, m) \cdot C(N' + 1, m)| \quad (15)$$

When a new (N'+1)-th transmitter and receiver pair starts power transmission in a state that the N' existing transmitter and receiver pairs are transmitting power, one code sequence is selected and assigned to the new (N'+1)-th transmitter and receiver pair so as to reduce or minimizes the current characteristic value.

The controller 10A may measure an actual current value for the existing transmitter and receiver pairs using the current meter 3m when the new transmitter and receiver pair starts power transmission, instead of storing the calculated current value B (m) for the existing transmitter and receiver pairs. Thus, it is possible to more correctly know the magnitude of the actual modulated current I2 flowing in the transmission path 3, and select and assign a more appropriate code sequence to the new transmitter and receiver pair.

Thus, according to the present embodiment, when a new transmitter and receiver pair starts power transmission in the state that at least one existing transmitter and receiver pair is transmitting power, it is possible to select and assign one code sequence to the new transmitter and receiver pair with a smaller amount of computation than that required when calculating a current characteristic value for all the transmitter and receiver pairs.

Next, we describe additional conditions for selecting code sequences.

According to simulation conducted by the present inventors, it is found that demodulated currents having desired and correct waveforms can be generated, when modulation codes used by code modulators of a plurality of transmitter and receiver pairs have the same length and are synchronized with each other, and each modulation code have a head bit of the same value.

FIG. 20 are waveform diagrams, where (a) to (e) show exemplary signal waveforms of a power transmission system according to a second comparison example of the fourth embodiment. In FIG. 20, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32.

In case of FIG. 20, the modulation code m11 of the code modulator 2A-1 and the modulation code m12 of the code modulator 2A-2 are given as follows.

$$m11=[1\ -1\ 1\ 1\ 1\ -1\ -1\ -1\ 1\ -1\ -1\ -1\ 1\ 1] \quad (16)$$

$$m12=[-1\ 1\ -1\ -1\ 1\ 1\ 1\ 1\ -1\ 1\ 1\ -1\ -1\ -1] \quad (17)$$

When the modulation codes m11 and m12 have head bits of the same value as shown in FIGS. 18 and 19, the waveforms of the demodulated currents I31 and I32 is substantially identical to the waveforms of the generated currents I11 and I12. On the other hand, when the modulation codes m11 and m12 have head bits of different values as shown in FIG. 20, there is a larger deviation between the waveforms of the demodulated currents I31 and I32 and the waveforms of the generated currents I11 and I12.

Thus, by setting modulation codes having a head bit of the same value to the code modulators 2A-1 and 2A-2, advantageously, it is possible to reduce mutual influences among the plurality of transmitter and receiver pairs during power transmission, and separate and extract only powers required by the loads 5-1 and 5-2.

The power transmission system of the present embodiment is capable of actively specifying a plurality of transmitter and receiver pairs, and amounts of powers transmitted by the respective transmitter and receiver pairs, and further capable of simultaneously and independently transmit powers by the respective transmitter and receiver pairs in the one transmission path 3, and reducing an amount of current flowing in the transmission path 3.

Thus, according to the power transmission system according to the present embodiment, it is possible to reduce the size and thickness of the power transmitter apparatuses and the power receiver apparatuses, reduce the number of power transmission cables, and simultaneously and more surely perform power transmissions from the plurality of power transmitter apparatuses to the plurality of power receiver apparatuses.

Fifth Embodiment

A power transmission system according to a fifth embodiment is configured in a manner similar to that of the power transmission system according to the fourth embodiment.

Current flowing in a transmission path may generate considerably large electromagnetic noise. Conventionally, countermeasure components, such as a noise filter, are required in order to reduce noise, and therefore, costs of the transmission path increase. Accordingly, it is required to reduce the amount of noise generated by the current flowing in the transmission path, in order to reduce the cost of the transmission path.

According to the present embodiment, a power transmission system which transmits powers from a plurality of power supplies to a plurality of loads is provided, the power transmission system capable of distinguishing and separating transmitted powers from each other, and reducing a total amount of current flowing in a transmission path 3, and further reducing electromagnetic noise generated from code-modulated waves flowing in the transmission path 3.

FIG. 21 is a diagram showing a frequency spectrum of an exemplary modulated current I2 in a power transmission system according to a first implementation example of a fifth embodiment. FIG. 21 shows a frequency spectrum obtained by performing Fast Fourier Transform (FFT) on the modulated current I2 of FIG. 18(c), when power is transmitted under the same conditions as those of the case of FIG. 18. Referring to FIG. 21, a maximum peak of −15.2 dB appears at 26 kHz, and a peak of −16.6 dB appears at 5 kHz, which is a frequency of the generated currents I11 and I12.

FIG. 22 are waveform diagrams, where (a) to (e) show exemplary signal waveforms of a power transmission system according to a second implementation example of the fifth embodiment. In FIG. 22, (a) shows a signal waveform of a generated current I11, (b) shows a signal waveform of a generated current I12, (c) shows a signal waveform of the modulated current I2, (d) shows a signal waveform of a demodulated current I31, and (e) shows a signal waveform of a demodulated current I32. More specifically, FIG. 22 shows exemplary signal waveforms generated as follows: code modulators 2A-1 and 2A-2 modulate the alternating-current generated currents I11 and I12 by code modulation, and then, the modulated current I2 is transmitted via the transmission path 3, and then, code demodulators 4A-1 and 4A-2 demodulate the modulated current I2 by code demodulation. For example, each of the alternating-current generated currents I11 and I12 has a rectangular waveform at a frequency of 5 kHz, which cyclically repeats positive and negative periods every 200 microseconds.

In case of FIG. 22, a modulation code m11 of the code modulator 2A-1 and a modulation code m12 of the code modulator 2A-2 are, for example, given as follows.

$$m11=[1\ -1\ 1\ 1\ 1\ -1\ -1\ -1\ 1\ -1\ -1\ -1\ 1\ 1] \quad (18)$$

$$m12=[1\ 1\ -1\ -1\ 1\ -1\ 1\ -1\ -1\ 1\ 1\ 1\ -1\ 1\ -1] \quad (19)$$

FIG. 23 is a diagram showing a frequency spectrum of the exemplary modulated current I2 in the power transmission system according to the second implementation example of the fifth embodiment. FIG. 23 shows a frequency spectrum obtained by performing FFT on the modulated current I2 of FIG. 22(c), when power is transmitted under the same conditions as those of the case of FIG. 22. Referring to FIG. 23, a maximum peak of −16.4 dB appears at 36 kHz, and a peak of −20 dB appears at 5 kHz.

FIG. 24 are waveform diagrams, where (a) to (e) show exemplary signal waveforms of a power transmission system according to a third implementation example of the fifth embodiment. In FIG. 24, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32. More specifically, FIG. 24 shows exemplary signal waveforms generated as follows: the code modulators 2A-1 and 2A-2 modulate the alternating-current generated currents I11 and I12 by code modulation, and then, the modulated current I2 is transmitted via the transmission path 3, and then, the code demodulators 4A-1 and 4A-2 demodulate the modulated current I2 by code demodulation. For example, each of the alternating-current generated currents I11 and I12 has a rectangular waveform at a frequency of 5 kHz, which cyclically repeats positive and negative periods every 200 microseconds.

In case of FIG. 24, the modulation code m11 of the code modulator 2A-1 and the modulation code m12 of the code modulator 2A-2 are, for example, given as follows.

$$m11=[1\ -1\ 1\ 1\ 1\ -1\ -1\ -1\ 1\ -1\ -1\ -1\ 1\ 1\ 1] \tag{20}$$

$$m12=[1\ -1\ 1\ -1\ -1\ 1\ 1\ -1\ 1\ -1\ 1\ 1\ -1\ -1] \tag{21}$$

FIG. 25 is a diagram showing a frequency spectrum of the exemplary modulated current I2 in the power transmission system according to the third implementation example of the fifth embodiment. FIG. 25 shows a frequency spectrum obtained by performing FFT on the modulated current I2 of FIG. 24(c), when power is transmitted under the same conditions as those of the case of FIG. 24. Referring to FIG. 25, a maximum peak of −13 dB appears at 26 kHz, and the value at 5 kHz is lower than −30 dB without a peak.

According to FIGS. 22(d) and (e) and FIGS. 24(d) and (e), it can be seen that even when using either combination of modulation codes, the alternating-current generated currents I11 and I12 are modulated by code modulation to generate the modulated current I2, and then, the modulated current I2 is transmitted via a transmission path 3, and then, the modulated current I2 is demodulated by code demodulation to generate the direct-current demodulated currents I31 and I32.

On the other hand, according to FIG. 21, FIG. 23, and FIG. 25, it can be seen that even when transmitting the same power, the currents flowing in the transmission path 3 have the peak values in the frequency domain with different magnitudes and different frequencies from each other.

Accordingly, a controller 10A selects and assigns a plurality of code sequences to a plurality of transmitter and receiver pairs so as to minimize a maximum peak value of a frequency spectrum of a total current of the code-modulated waves of the plurality of transmitter and receiver pairs in the transmission path 3.

Thus, according to the configuration of the present embodiment, by reducing the maximum peak value of the frequency spectrum of the total current in the transmission path 3, advantageously, it is possible to reduce electromagnetic noise generated by power transmission, and reduce countermeasure parts and circuits for noise, thus reducing costs of the power transmission system.

Alternatively, the controller 10A may select and assign a plurality of code sequences to a plurality of transmitter and receiver pairs so as to minimize a peak value having a lowest frequency among one or more peak values of a frequency spectrum of a total current of the code-modulated waves of the plurality of transmitter and receiver pairs in the transmission path 3.

Thus, it is possible to reduce sizes of filter components required for reducing electromagnetic noise, and therefore, advantageously, it is possible to further reduce the size of the power transmission system.

Alternatively, the controller 10A may select and assign a plurality of code sequences to a plurality of transmitter and receiver pairs, such that a total current of the code-modulated waves of the plurality of transmitter and receiver pairs in the transmission path 3 meets a predetermined criterion for electromagnetic interference.

Specifically, the code sequences are selected as follows.

For the purpose of explanation, we again use the notation of the generated current A(n, m) and the modulation code C(n, m) of the fourth embodiment (1≤n≤N, 1≤m≤M). FFT is performed on a vector made of values of a total current of code-modulated waves at moments of respective bits in one cycle of the modulation code (i.e., values of modulated current I2 sampled in discrete time), based on the magnitudes of the generated currents and values of bits of the modulation codes.

$$FFT\left[\sum_{n=1}^{N} A(n, 1) \cdot C(n, 1), \ldots, \sum_{n=1}^{N} A(n, m) \cdot C(n, m), \ldots, \sum_{n=1}^{N} A(n, M) \cdot C(n, M)\right] \tag{22}$$

Before starting new power transmission from a plurality of code modulators to a plurality of code demodulators, a plurality of code sequences are selected and assigned to the plurality of transmitter and receiver pairs so as to reduce electromagnetic noise generated from the code-modulated waves flowing in the transmission path 3 (i.e., minimize a maximum peak value of frequency spectrum, or minimize a peak value having a lowest frequency, or meet a predetermined criterion for electromagnetic interference).

In addition, the controller 10A may select and assign a plurality of code sequences to a plurality of transmitter and receiver pairs, so as to reduce electromagnetic noise generated from the code-modulated waves flowing in the transmission path 3, and reduce or minimize the total amount of current flowing in the transmission path 3. In this case, the controller 10A gives priority to either reduction of electromagnetic noise or reduction of the amount of current, and at first, selects a set of code sequences so as to reduce the prioritized parameter. When a plurality of sets of code sequences can be selected so as to reduce the prioritized parameter, the controller 10A selects a set of code sequences so as to further reduce the non-prioritized parameter. If possible, the controller 10A may select a set of code sequences so as to minimize both the electromagnetic noise and the amount of current.

According to the power transmission system according to the present embodiment, when transmitting powers from a plurality of power supplies to a plurality of loads, it is possible to distinguish and separate transmitted powers from each other, reduce a total amount of current flowing in the transmission path 3, and further reduce electromagnetic noise generated from code-modulated waves flowing in the transmission path 3.

Sixth Embodiment

FIG. 26 is a block diagram showing a configuration of a power transmission system according to a sixth embodiment. Referring to FIG. 26, the power transmission system according to the sixth embodiment is provided with a plurality of power generators 1-1 to 1-4, a plurality of code modulator and demodulators 2B-1, 2B-2, 4B-1, and 4B-2, a transmission path 3, a plurality of loads 5-1 to 5-4, switches SW1 to SW4, and a controller 10B.

The power generators 1-1 to 1-4 are configured in a manner similar to that of the power generator 1 of FIG. 1, and are provided with power meters 1m-1 to 1m-4, respectively. In addition, the loads 5-1 to 5-4 are configured in a manner similar to that of the load 5 of FIG. 1, and are provided with power meters 5m-1 to 5m-4, respectively.

The code modulator and demodulators 2B-1 and 2B-2 are configured in a manner similar to that of the code modulator 2A of the second embodiment (FIG. 10). The code modulator and demodulators 4B-1 and 4B-2 are configured in a manner similar to that of the code demodulator 4A of the second embodiment (FIG. 11). As described above in the second embodiment, since the code modulation circuit 23A of FIG. 10 and the code demodulation circuit 33A of FIG. 11 are provided with the bidirectional switch circuits SS21 to SS24 and SS31 to SS34, these circuits are reversible.

The switches SW1 to SW4 are controlled by the controller 10B. The switch SW1 connects one of the power generator 1-1 and the load 5-1, to the code modulator and demodulator 2B-1. The switch SW2 connects one of the power generator 1-2 and the load 5-2, to the code modulator and demodulator 2B-2. The switch SW3 connects one of the power generator 1-3 and the load 5-3, to the code modulator and demodulator 4B-1. The switch SW4 connects one of the power generator 1-4 and the load 5-4, to the code modulator and demodulator 4B-2.

According to the power transmission system of FIG. 26, it is possible to transmit power from any one of the code modulator and demodulators 2B-1, 2B-2, 4B-1, and 4B-2 to another one by controlling the switches SW1 to SW4.

The power transmission system of FIG. 26 may be further provided with a current meter 3m which measures an amount of current of a code-modulated wave transmitted in a transmission path 3.

Each of the code modulator and demodulators 2B-1, 2B-2, 4B-1, and 4B-2 can operate in a manner similar to those of the code modulator and the code demodulator according to the third to fifth embodiments.

According to the power transmission system of FIG. 26, by using the code modulator and demodulators 2B-1, 2B-2, 4B-1, and 4B-2, it is possible to consume surplus energy at a portion demanding the energy, and thus improving overall energy efficiency of the power transmission system. In addition, it is possible to efficiently transmit direct-current power and alternating-current power, it is possible to achieve the power transmission system provided with favorable code modulators and code demodulators.

FIG. 27 is a block diagram showing a configuration of a power transmission system according to a modified embodiment of the sixth embodiment. The power transmission system of FIG. 27 differs from the power transmission system of FIG. 26 in following points.

(1) A rotating machine 6-1 having two operation modes, i.e., a power generator mode and an electric motor (load) mode is provided in place of the power generator 1-1, the load 5-1, and the switch SW1. A power meter 6m-1 is provided in place of the power meters 1m-1 and 5m-1.

(2) A rotating machine 6-2 having two operation modes, i.e., a power generator mode and an electric motor (load) mode is provided in place of the power generator 1-2, the load 5-2, and the switch SW2. A power meter 6m-2 is provided in place of the power meters 1m-2 and 5m-2.

(3) A rotating machine 6-3 having two operation modes, i.e., a power generator mode and an electric motor (load) mode is provided in place of the power generator 1-3, the load 5-3, and the switch SW3. A power meter 6m-3 is provided in place of the power meters 1m-3 and 5m-3.

(4) A rotating machine 6-4 having two operation modes, i.e., a power generator mode and an electric motor (load) mode is provided in place of the power generator 1-4, the load 5-4, and the switch SW4. A power meter 6m-4 is provided in place of the power meters 1m-4 and 5m-4.

(5) A controller 10C receives amounts of powers from the power meters 6m-1 to 6m-4, and controls operations of the code modulator and demodulators 2B-1, 2B-2, 4B-1, and 4B-2 in response to the received amounts of powers in a manner similar to that of the controller 10B of FIG. 26.

Referring to FIG. 27, when any one of the rotating machines 6-1 to 6-4 operates in the power generator mode, another one of the rotating machines 6-1 to 6-4 operates in the electric motor mode. In this case, the code modulator and demodulator connected to the rotating machine operating in the power generator mode operates as a code modulator, and the code modulator and demodulator connected to the rotating machine operating in the electric motor mode operates as a code demodulator.

According to the power transmission system of FIG. 27, by using the code modulator and demodulators 2B-1, 2B-2, 4B-1, and 4B-2, it is possible to consume surplus energy at a portion demanding the energy, and thus improving overall energy efficiency of the power transmission system, in a manner similar to that of the power transmission system of FIG. 26. In addition, it is possible to efficiently transmit direct-current power and alternating-current power, it is possible to achieve the power transmission system provided with favorable code modulators and code demodulators.

Other Embodiments

In the second to sixth embodiments, when the power generator generates alternating-current power, the frequency of the generated power may be measured and notified to the controller.

In the fourth to sixth embodiments, when a new transmitter and receiver pair starts power transmission in a state that at least one existing transmitter and receiver pair is transmitting power, the code modulator of this new transmitter and receiver pair may select the code sequence, instead of the controller. In this case, the code modulator measures a total current of the code-modulated wave of the existing transmitter and receiver pair in the transmission path 3, and calculates a current characteristic value of a total current of the code-modulated wave of the existing transmitter and receiver pair, and the code-modulated wave of the new transmitter and receiver pair including the code modulator itself. The code modulator selects one code sequence so as to reduce or minimize the current characteristic value, and notifies a code demodulator to which power is to be transmitted, of the selected code sequence, using predetermined communication means.

In the third to sixth embodiments, a plurality of code modulators may use the same code sequence, and a plurality of code demodulators may use the same code sequence. Thus, one code modulator may transmit powers to a plurality of code demodulators, a plurality of code modulators may transmit powers to one code demodulator, and a plurality of code modulators may transmit powers to a plurality of code demodulators.

In the first to sixth embodiments, we have indicated the example in which power is transmitted using code modulation and code demodulation of current, but the power transmission is not limited thereto. Power may be transmitted using code modulation and code demodulation of direct-current or alternating-current voltage. In this case, similar advantageous effects can be achieved. In this case, when the plurality of transmitter and receiver pairs transmit powers, a plurality of code sequences may be selected and assigned to a plurality of transmitter and receiver pairs so as to reduce or minimize an average of an absolute value of a total voltage of the code-modulated waves of the plurality of transmitter and receiver pairs in the transmission path, the average being averaged over a predetermined time.

REFERENCE SIGNS LIST 1, 1-1 to 1-4: POWER GENERATOR,
1m, 1m-1 to 1m-4: POWER METER,
2, 2-1, 2-2, 2A, 2A-1, 2A-2: CODE MODULATOR,
2B-1, 2B-2: CODE MODULATOR AND DEMODULATOR,
3: TRANSMISSION PATH,
3m: CURRENT METER,
4, 4-1, 4-2, 4A, 4A-1, 4A-2: CODE DEMODULATOR,
4B-1, 4B-2: CODE MODULATOR AND DEMODULATOR,
5, 5-1 to 5-4: LOAD,
5m, 5m-1 to 5m-4: POWER METER,
6-1 to 6-4: ROTATING MACHINE,
6m-1 to 6m-4: POWER METER,
10, 10A, 10B, 10C: CONTROLLER,
11: CONTROL CIRCUIT,
12, 12A: COMMUNICATION CIRCUIT,
20: CONTROL CIRCUIT,
21: COMMUNICATION CIRCUIT,
22, 22A: CODE GENERATION CIRCUIT,
23, 23A: CODE MODULATION CIRCUIT,
30: CONTROL CIRCUIT,
31: COMMUNICATION CIRCUIT,
32, 32A: CODE GENERATION CIRCUIT,
33, 33A: CODE DEMODULATION CIRCUIT,
D1 to D34: DIODE,
S1 to S74: SWITCH ELEMENT,
SS1 to SS34, SS21A to SS34A: SWITCH CIRCUIT,
SW1 to SW4: SWITCH,

The invention claimed is:

1. A power transmission system, comprising a plurality of power transmitter apparatuses, a plurality of power receiver apparatuses, and a controller, the power transmission system transmitting powers from the plurality of power transmitter apparatuses to the plurality of power receiver apparatuses via a transmission path,
wherein each of the plurality of power transmitter apparatuses comprises a code modulator that modulates first power to generate a code-modulated wave by code modulation using a modulation code based on a code sequence, and transmits the code-modulated wave to one of the plurality of power receiver apparatuses via the transmission path;
wherein each of the plurality of power receiver apparatuses comprises a code demodulator that receives the code-modulated wave from one of the plurality of power transmitter apparatuses via the transmission path, and demodulates the received code-modulated wave to generate second power by code demodulation using a demodulation code based on a code sequence identical to the code sequence of the modulation code used for the code modulation; and
wherein, when power is transmitted between each of a plurality of transmitter and receiver pairs, each of the transmitter and receiver pairs including one of the plurality of power transmitter apparatuses and one of the plurality of power receiver apparatuses, the controller selects and assigns a plurality of code sequences to the plurality of transmitter and receiver pairs, respectively, so as to reduce an average of an absolute value of a total current of the code-modulated waves of the plurality of transmitter and receiver pairs in the transmission path, as compared to a predetermined reference value, the average being averaged over a predetermined time.

2. The power transmission system as claimed in claim 1, wherein, when a new transmitter and receiver pair starts power transmission in a state that at least one existing transmitter and receiver pair is transmitting power, the controller selects and assigns one code sequence to the new transmitter and receiver pair, so as to reduce an average of an absolute value of a total current of the code-modulated wave of the existing transmitter and receiver pair, and the code-modulated wave of the new transmitter and receiver pair, in the transmission path, as compared to the reference value, the average being averaged over the predetermined time.

3. The power transmission system as claimed in claim 1, wherein the controller selects and assigns a plurality of code sequences to the plurality of transmitter and receiver pairs, respectively, so as to minimize a maximum peak value of a frequency spectrum of a total current of the code-modulated waves of the plurality of transmitter and receiver pairs in the transmission path.

4. The power transmission system as claimed in claim 1, wherein the controller selects and assigns a plurality of code sequences to the plurality of transmitter and receiver pairs, respectively, so as to minimize a peak value having a lowest frequency among one or more peak values of a frequency spectrum of a total current of the code-modulated waves of the plurality of transmitter and receiver pairs in the transmission path.

5. The power transmission system as claimed in any claim 1,
wherein the controller selects and assigns a plurality of code sequences to the plurality of transmitter and receiver pairs, respectively, such that a total current of the code-modulated waves of the plurality of transmitter and receiver pairs in the transmission path meets a predetermined criterion for electromagnetic interference.

6. The power transmission system as claimed in claim 1, wherein the modulation codes used by the power transmitter apparatuses of the plurality of transmitter and receiver pairs have a same length, are synchronized with each other, and have a head bit of an identical value.

7. The power transmission system as claimed in claim 1, wherein the plurality of code sequences are orthogonal to each other.

8. The power transmission system as claimed in claim 1, wherein in each of the plurality of power transmitter apparatuses, the first power is direct-current power or alternating-current power; and
wherein in each of the plurality of power receiver apparatuses, the second power is direct-current power or alternating-current power.

9. The power transmission system as claimed in claim 1, wherein the code modulator of at least one of the plurality of power transmitter apparatuses is further operable as a code demodulator;
wherein the code demodulator of at least one of the plurality of power receiver apparatuses is further operable as a code modulator; and
wherein power is transmitted from the power receiver apparatus comprising the code demodulator operable as the code modulator, to the power transmitter apparatus comprising the code modulator operable as the code demodulator.

10. The power transmission system as claimed in claim 1,
wherein the code modulator comprises a first generation circuit that generates the modulation code; and
wherein the code demodulator comprises a second generation circuit that generates the demodulation code.

11. The power transmission system as claimed in claim 10,
wherein the controller transmits a control signal for generating the modulation code, a modulation start time, and a modulation end time to the plurality of power transmitter apparatuses;
wherein the controller transmits a control signal for generating the demodulation code, a demodulation start time, and a demodulation end time to the plurality of power receiver apparatuses;
wherein in each of the plurality of power transmitter apparatuses, the code modulator modulates the first power to generate the code-modulated wave by code modulation based on the control signal for generating the modulation code, the modulation start time, and the modulation end time; and
wherein in each of the plurality of power receiver apparatuses, the code demodulator demodulates the code-modulated wave into the second power by code demodulation based on the control signal for generating the demodulation code, the demodulation start time, and the demodulation end time.

12. The power transmission system as claimed in claim 11, further comprising:
first power measuring means that measures amounts of the first power in the plurality of power transmitter apparatuses; and
second power measuring means that measures amounts of the second power in the plurality of power receiver apparatuses.

13. The power transmission system as claimed in claim 12,
wherein the controller controls operations of the plurality of power transmitter apparatuses and the plurality of power receiver apparatuses, based on the amounts of the first power measured by the first power measuring means, and the amounts of the second power measured by the second power measuring means, to transmit powers from the plurality of power transmitter apparatuses to the plurality of power receiver apparatuses.

14. The power transmission system as claimed in claim 13, further comprising current measuring means that measures an amount of current in the transmission path.

15. The power transmission system as claimed in claim 14,
wherein the controller controls operations of the plurality of power transmitter apparatuses and the plurality of power receiver apparatuses based on the amount of current measured by the current measuring means, to transmit powers from the plurality of power transmitter apparatuses to the plurality of power receiver apparatuses.

16. A power transmission system, comprising a plurality of power transmitter apparatuses, a plurality of power receiver apparatuses, and a controller, the power transmission system transmitting powers from the plurality of power transmitter apparatuses to the plurality of power receiver apparatuses via a transmission path,
wherein each of the plurality of power transmitter apparatuses comprises a code modulator that modulates first power to generate a code-modulated wave by code modulation using a modulation code based on a code sequence, and transmits the code-modulated wave to one of the plurality of power receiver apparatuses via the transmission path;
wherein each of the plurality of power receiver apparatuses comprises a code demodulator that receives the code-modulated wave from one of the plurality of power transmitter apparatuses via the transmission path, and demodulates the received code-modulated wave to generate second power by code demodulation using a demodulation code based on a code sequence identical to the code sequence of the modulation code used for the code modulation; and
wherein, when power is transmitted between each of a plurality of transmitter and receiver pairs, each of the transmitter and receiver pairs including one of the plurality of power transmitter apparatuses and one of the plurality of power receiver apparatuses, the controller selects and assigns a plurality of code sequences to the plurality of transmitter and receiver pairs, respectively, so as to minimize an average of an absolute value of a total current of the code-modulated waves of the plurality of transmitter and receiver pairs in the transmission path, the average being averaged over a predetermined time.

17. The power transmission system as claimed in claim 16,
wherein, when a new transmitter and receiver pair starts power transmission in a state that at least one existing transmitter and receiver pair is transmitting power, the controller selects and assigns one code sequence to the new transmitter and receiver pair, so as to minimize an average of an absolute value of a total current of the code-modulated wave of the existing transmitter and receiver pair, and the code-modulated wave of the new transmitter and receiver pair, in the transmission path, the average being averaged over the predetermined time.

\* \* \* \* \*